US012693789B2

(12) United States Patent
Kim

(10) Patent No.: US 12,693,789 B2
(45) Date of Patent: Jul. 28, 2026

(54) STORAGE DEVICE AND OPERATING METHOD FOR JOURNAL DATA REPLAY

(71) Applicant: SAMSUNG ELECTRONICS CO., LTD., Suwon-si (KR)

(72) Inventor: Tae-Hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 18/086,777

(22) Filed: Dec. 22, 2022

(65) Prior Publication Data

US 2023/0325093 A1 Oct. 12, 2023

(30) Foreign Application Priority Data

Mar. 15, 2022 (KR) ........................ 10-2022-0031797

(51) Int. Cl.
G06F 3/06 (2006.01)

(52) U.S. Cl.
CPC .......... G06F 3/0619 (2013.01); G06F 3/0653 (2013.01); G06F 3/0679 (2013.01)

(58) Field of Classification Search
None
See application file for complete search history.

(56) References Cited

U.S. PATENT DOCUMENTS 9,927,985 B2 3/2018 Zhang et al.
9,940,261 B2 4/2018 Booth et al.

| | | | |
|---|---|---|---|
| 10,430,285 B2 | 10/2019 | Hutchison et al. | |
| 10,445,308 B2 | 10/2019 | Subrahmanyam et al. | |
| 10,540,102 B2 | 1/2020 | Peterson et al. | |
| 10,997,065 B2 | 5/2021 | Ha et al. | |
| 11,301,433 B2* | 4/2022 | Ben Dayan | G06F 3/0619 |
| 2013/0304703 A1 | 11/2013 | Kaneki | |
| 2015/0331760 A1* | 11/2015 | Dalessandro | G06F 3/0619 |
| | | | 714/19 |
| 2017/0060698 A1 | 3/2017 | Noe et al. | |
| 2019/0146911 A1 | 5/2019 | Ha et al. | |
| 2019/0147069 A1 | 5/2019 | Ben Dayan et al. | |
| 2019/0325055 A1 | 10/2019 | Lee et al. | |
| 2019/0347165 A1 | 11/2019 | Kim | |
| 2020/0117389 A1 | 4/2020 | Kang | |
| 2020/0218619 A1 | 7/2020 | Hwang et al. | |
| 2021/0026763 A1 | 1/2021 | Kim et al. | |
| 2024/0045597 A1* | 2/2024 | Cho | G06F 3/0656 |

(Continued)

FOREIGN PATENT DOCUMENTS

| | | |
|---|---|---|
| JP | 5340507 B2 | 11/2013 |
| KR | 10-1548452 B1 | 8/2015 |
| KR | 10-2017-0023735 A | 3/2017 |

(Continued)

*Primary Examiner* — Hosain T Alam
*Assistant Examiner* — Ryan Dare
(74) *Attorney, Agent, or Firm* — Fish & Richardson P.C.

(57) ABSTRACT

Disclosed is a storage device which includes a nonvolatile memory device, and a storage controller that controls the nonvolatile memory device and updates metadata based on an operation of the nonvolatile memory device, and the storage controller includes a journal data generator that generates a plurality of journal data associated with the update of the metadata, and a journal data replayer that replays the plurality of journal data in parallel to restore the metadata.

17 Claims, 19 Drawing Sheets

(56) References Cited

U.S. PATENT DOCUMENTS

2024/0168630 A1*  5/2024  Zhou ..................... G06F 3/0631

FOREIGN PATENT DOCUMENTS

| KR | 10-2019-0054974 A | 5/2019 |
| KR | 10-2020-0040544 A | 4/2020 |
| KR | 10-2020-0086143 A | 7/2020 |
| KR | 10-2146293 B1 | 8/2020 |
| KR | 10-2021-0012085 A | 2/2021 |

* cited by examiner

Figure 1:
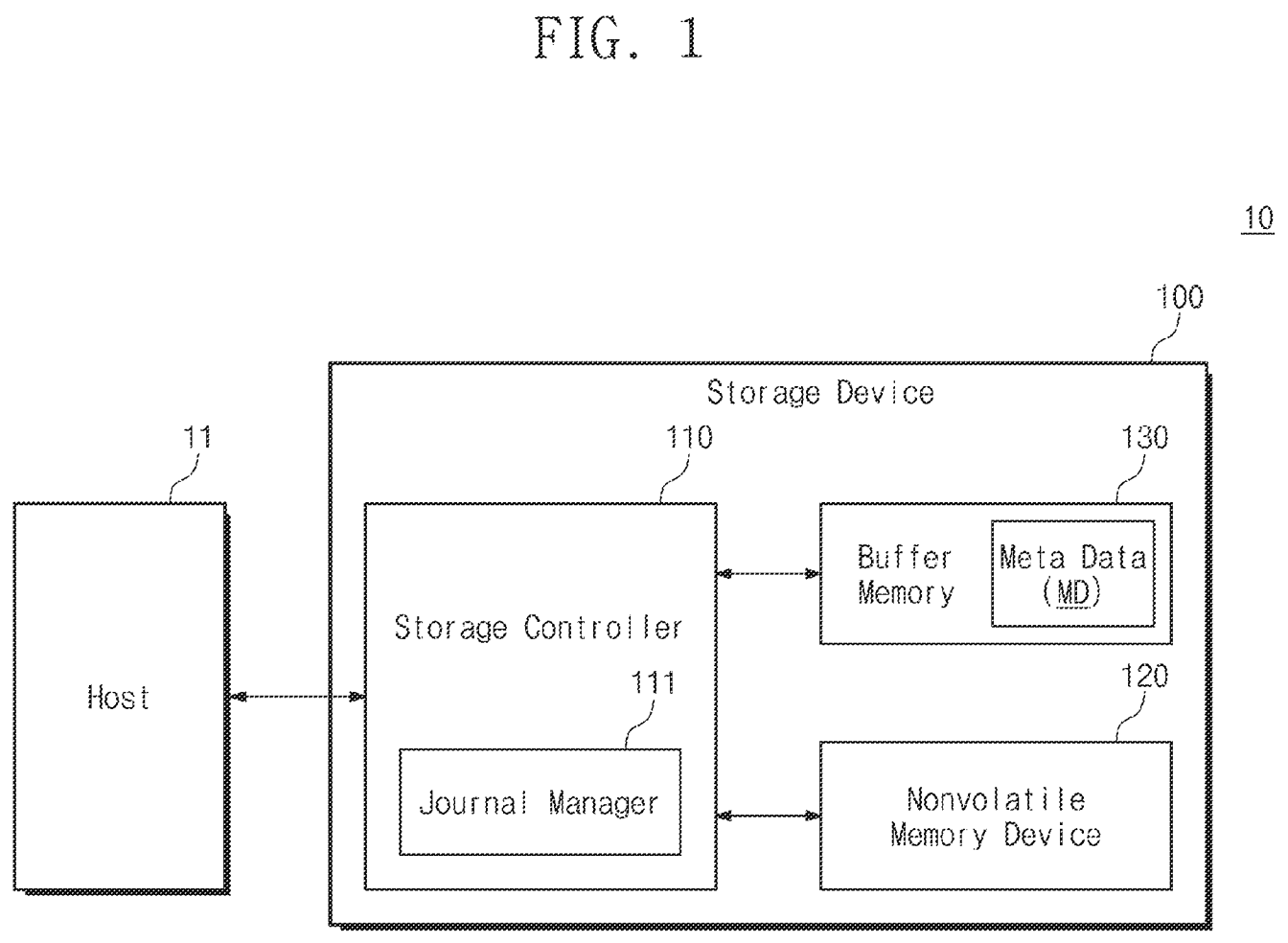

Host 11

Storage Device 100

Storage Controller 110

Journal Manager 111

Buffer Memory 130

Meta Data (MD)

Nonvolatile Memory Device 120

[Journal Data Write and Flush]

FIG. 4

JNL
[in Journal Memory]

Journal Data
Write Order

| JNL_A0 | JNL_B0 | JNL_C0 | JNL_D0 | JNL_A1 | JNL_C1 | JNL_B1 | JNL_A2 | JNL_D1 | JNL_B2 | JNL_D2 | JNL_C2 |

[Meta Data Restore]

FIG. 7

JNL_L2P_1 ①
JNL_VPBSET_1 ②
JNL_L2P_2 ③
JNL_VPBCLR_1 ④
JNL_VPBSET_2 ⑤
JNL_L2P_3 ⑥
JNL_VPBCLR_2 ⑦
JNL_VPBSET_3 ⑧

Journal Data
Splitting Unit

JNL_L2P_1 ①
JNL_L2P_2 ③
JNL_L2P_3 ⑥

JNL_VPBSET_1 ②
JNL_VPBCLR_1 ④

JNL_VPBSET_2 ⑤
JNL_VPBCLR_2 ⑦

JNL_VPBSET_3 ⑧

Journal Data
Replying Unit #0 → Update L2P

Journal Data
Replying Unit #1 → Update VPB1

Journal Data
Replying Unit #2 → Update VPB2

Journal Data
Replying Unit #3 → Update VPB3

FIG. 9

JNL

| Journal Opcode | Journal Address | Journal Data |
|---|---|---|

STORAGE DEVICE AND OPERATING METHOD FOR JOURNAL DATA REPLAY

CROSS-REFERENCE TO RELATED APPLICATIONS

This application claims priority under 35 U.S.C. § 119 to Korean Patent Application No. 10-2022-0031797 filed on Mar. 15, 2022, in the Korean Intellectual Property Office, the disclosure of which is incorporated by reference herein in its entirety.

BACKGROUND

Embodiments of the present disclosure described herein relate to a semiconductor memory, and more particularly, relate to a storage device and an operating method thereof.

A semiconductor memory device is classified as a volatile memory device, in which stored data disappears when a power supply is turned off, such as in a static random access memory (SRAM) or a dynamic random access memory (DRAM), or a nonvolatile memory device, in which stored data is retained even when a power supply is turned off, such as in a flash memory device, a phase-change RAM (PRAM), a magnetic RAM (MRAM), a resistive RAM (RRAM), or a ferroelectric RAM (FRAM).

The flash memory device is currently being widely used as a high-capacity storage device. A controller configured to control the flash memory device controls the flash memory device by using a mapping table. The mapping table is a device of important metadata for guaranteeing the reliability of data. Accordingly, when the metadata such as the mapping table is lost, the reliability of data stored in the storage device is incapable of being guaranteed, various techniques for preventing the loss of such metadata are being developed.

SUMMARY OF THE INVENTION

Embodiments of the present disclosure provide a storage device with improved reliability and improved performance and an operating method thereof.

According to an embodiment, a storage device includes a nonvolatile memory device, and a storage controller that controls the nonvolatile memory device and updates metadata based on the control for the nonvolatile memory device, and the storage controller includes a journal data generator that generates a plurality of journal data associated with the update of the metadata, and a journal data replayer that replays the plurality of journal data in parallel to restore the metadata.

According to an embodiment, an operating method of a storage device which includes a nonvolatile memory device and a storage controller configured to control the nonvolatile memory device includes reading a plurality of journal data from the nonvolatile memory device, splitting the plurality of journal data into a plurality of groups based on dependency of the plurality of journal data, and replaying journal data, respectively included in the plurality of groups in parallel to restore metadata.

According to an embodiment, a storage device includes a nonvolatile memory device, and a storage controller that controls the nonvolatile memory device. The storage controller includes a journal data generator that generates first to fourth journal data associated with an update of metadata, a first replaying unit, and a second replaying unit. When the metadata is lost, the first and second replaying units are configured to replay the first to fourth journal data to restore the metadata. The first replaying unit replays the first and second journal data, and while the first replaying unit replays the first and second journal data, the second replaying unit replays the third and fourth journal data.

According to an embodiment, a storage system includes a first storage device, a second storage device, and a host that controls the first and second storage devices and manages metadata for controlling the first and second storage devices. The host includes a journal manager configured to generate a plurality of journal data associated with an update of the metadata. When the metadata are lost, the journal manager replays the plurality of journal data to restore the metadata. The journal manager includes a first replaying unit that replays a plurality of first journal data corresponding to the first storage device from among the plurality of journal data, and a second replaying unit that replays a plurality of second journal data corresponding to the second storage device from among the plurality of journal data while the first replaying unit replays the plurality of first journal data.

According to an embodiment, a storage system includes a first host, a second host, and a storage device that performs an operation under control of the first and second hosts and manages metadata according to the operation. The storage device includes a journal manager configured to generate a plurality of journal data associated with an update of the metadata. When the metadata is lost, the journal manager replays the plurality of journal data to restore the metadata. The journal manager includes a first replaying unit that replays a plurality of first journal data corresponding to the first host from among the plurality of journal data, and a second replaying unit that replays a plurality of second journal data corresponding to the second host from among the plurality of journal data while the first replaying unit replays the plurality of first journal data.

BRIEF DESCRIPTION OF THE DRAWINGS

The above and other objects and features of the present disclosure will become apparent by the detailed description of their embodiments thereof with reference to the accompanying drawings.

FIG. 1 is a block diagram illustrating a storage system according to an embodiment of the present disclosure.

FIG. 4 is a diagram illustrating journal data stored in a journal memory of FIG. 3.

FIG. 7 is a diagram for describing a configuration of journal data managed by a journal manager of FIG. 3 in detail.

FIG. 9 is a timing diagram for describing an operation of a journal data replayer of FIG. 6.

FIG. 16 is a block diagram illustrating a host-storage system according to an embodiment of the present disclosure.

FIG. 17 is a block diagram illustrating a storage system according to an embodiment of the present disclosure.

DETAILED DESCRIPTION OF THE PREFERRED EMBODIMENTS

Figure 2:
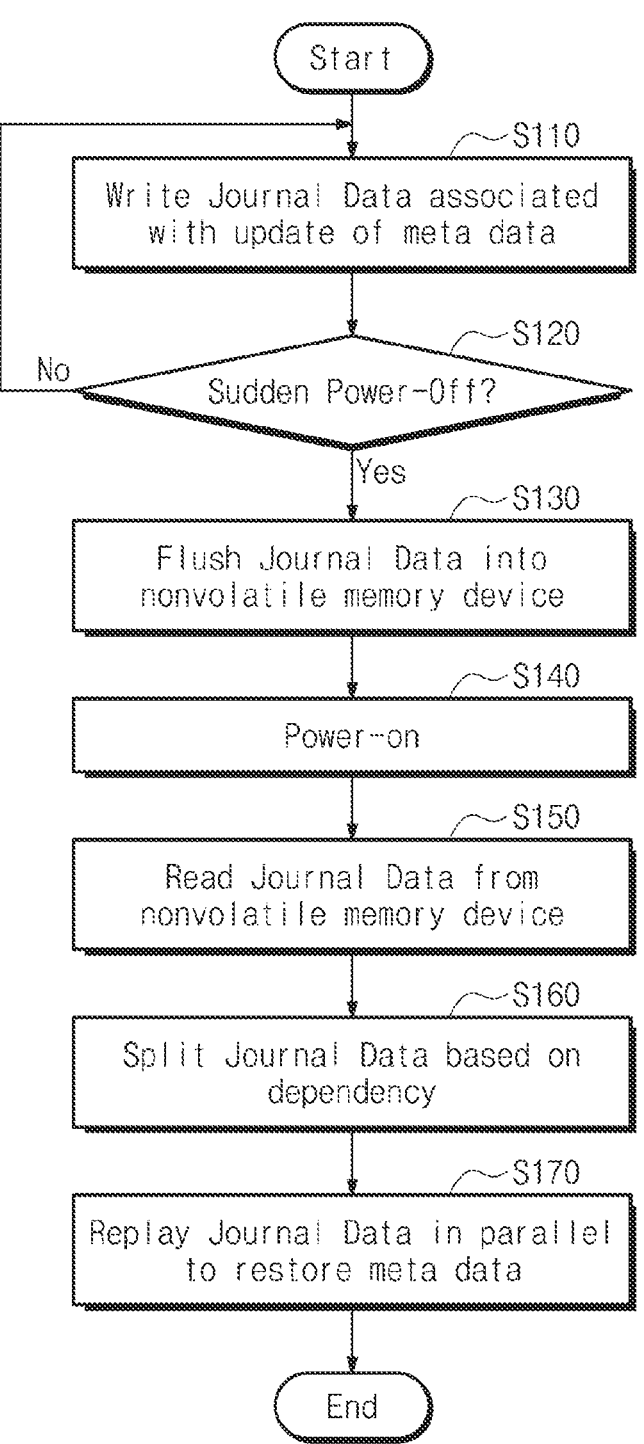
FIG. 2 is a flowchart illustrating an operation of a storage device of FIG. 1.

Below, embodiments of the present disclosure will be described in such detail and clarity, that any person of skill in the art may easily implement the invention.

FIG. 1 is a block diagram illustrating a storage system according to an embodiment of the present disclosure. Referring to FIG. 1, a storage system 10 may include a host 11 and a storage device 100.

The host 11 may store data in the storage device 100 or may read data stored in the storage device 100. The host 11 may control the storage device 100 based on a given interface. In an embodiment, the given interface may include one of various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, and a CF (Compact Flash) card interface.

The storage device 100 may include a storage controller 110, a nonvolatile memory device 120, and a buffer memory 130. Under control of the host 11, the storage controller 110 may store data in the nonvolatile memory device 120 or may read data stored in the nonvolatile memory device 120.

The nonvolatile memory device 120 may operate under control of the storage controller 110. In an embodiment, the nonvolatile memory device 120 may be a NAND flash memory device, however the present disclosure is not limited thereto. For example, the nonvolatile memory device 120 may be based on various nonvolatile devices such as a PRAM, an RRAM, and a MRAM or the like.

The buffer memory 130 may be configured to temporarily store data to be stored in the nonvolatile memory device 120 or data read from the nonvolatile memory device 120. In an embodiment, the buffer memory 130 may be a DRAM, however the present disclosure is not limited thereto. For example, the buffer memory 130 may include one of various high-speed memories such as an SRAM, a PRAM, a RRAM, and an MRAM or the like.

In an embodiment, the buffer memory 130 may store a variety of information (e.g., metadata MD) necessary for the storage device 100 to operate. For example, the storage controller 110 may manage data stored in the nonvolatile memory device 120 through an address translation operation. The address translation operation refers to an operation of translating a logical block address managed by the host 11 into a physical block address of the nonvolatile memory device 120. The address translation operation may be performed through a mapping table. The mapping table may be stored in the buffer memory 130 so as to be managed.

Below, to describe embodiments of the present disclosure simply, the description will be given as in the case in which the metadata MD correspond to the mapping table. However, the present disclosure is not limited thereto. For example, the metadata MD may include a variety of information necessary for the storage device 100 to operate.

In an embodiment, when the metadata MD is lost due to various causes, the reliability of data stored in the nonvolatile memory device 120 is incapable of being guaranteed. To prevent the loss of the metadata MD, the storage controller 110 may manage journal data including update information of the metadata MD. For example, the storage controller 110 may include a journal manager 111. The journal manager 111 may write and manage the update information of the metadata MD in the form of journal data. In an embodiment, the journal data that are managed by the journal manager 111 may be stored in an internal buffer included in the storage controller 110 or may be stored in the buffer memory 130 located externally of the storage controller 110.

In an embodiment, when the metadata MD is lost in various situations, the journal manager 111 may restore the lost metadata MD by replaying the written journal data. For example, the storage controller 110 may periodically store the metadata MD of the buffer memory 130 in the nonvolatile memory device 120. In the storage system 10, when sudden power-off (SPO) occurs, the storage device 100 may perform a sudden power-off operation by using an internal power source (e.g., a capacitor power). In this case, because a capacity of the metadata MD present in the buffer memory 130 is relatively large, the metadata MD may not be flushed to the nonvolatile memory device 120. That is, in the sudden power-off, the metadata MD stored (or present) in the nonvolatile memory device 120 may not be the latest version; in this case, partial information of the metadata MD may be lost. In contrast, because a capacity of journal data managed by the journal manager 111 is relatively small, in a sudden power-off, the journal data may be flushed to the nonvolatile memory device 120. Afterwards, when the storage system 10 is powered on, the storage controller 110 may restore the metadata MD by replaying the journal data flushed to the nonvolatile memory device 120.

In general, the replay for journal data is sequentially performed in the order of writing journal data. In such a case, a time taken to replay journal data may increase, thereby causing an increase in a time taken to restore the metadata MD. In contrast, according to the present disclosure, the storage controller 110 (or the journal manager 111) may split journal data into a plurality of groups based on the dependency of journal data and may replay portions of journal data of the split groups individually or in parallel. In the case of performing a replay operation on journal data in parallel, a time taken to restore the metadata MD may be shortened. Also, because the journal data to be replayed in parallel is split based on the dependency of the journal data, the reliability of metadata may be guaranteed. A journal data management method of the storage controller 110 according to embodiments of the present disclosure will be described in detail with reference to the following drawings.

FIG. 2 is a flowchart illustrating an operation of a storage device of FIG. 1. Below, to describe embodiments of the present disclosure clearly, it is assumed that the metadata MD correspond to the mapping table. However, the present disclosure is not limited thereto. For example, the metadata MD may include a variety of other information. Below, it is assumed that a situation in which the metadata MD are restored, is a situation in which a power is turned on after the sudden power-off. However, the present disclosure is not limited thereto. For example, the situation in which the metadata MD are restored may include various different other situations. For example, when an error occurs in the metadata MD while the storage device 100 operates, the storage controller 110 may restore the metadata MD through the replay operation of journal data as described below.

Referring to FIGS. 1 and 2, in operation S110, the storage device 100 may write journal data associated with the update of the metadata MD. For example, the storage controller 110 may perform various operations (e.g., a read operation, a write operation, and an erase operation) for the nonvolatile memory device 120. In this case, the metadata MD may be updated, and the journal manager 111 of the storage controller 110 may write journal data associated with the update of the metadata MD.

In operation S120, the storage device 100 may sense the sudden power-off. For example, the storage device 100 may sense the sudden power-off by detecting a voltage drop of a power supply voltage provided from the host 11 or an external power supply (e.g., a power management integrated circuit (PMIC)). When the sudden power-off is not sensed, the storage device 100 continues to perform operation S110.

When the sudden power-off is sensed, in operation S130, the storage device 100 may flush the journal data to the nonvolatile memory device 120. For example, when the sudden power-off occurs, the storage controller 110 of the storage device 100 may flush a variety of information or important information present in the buffer memory 130 or the internal memory to the nonvolatile memory device 120 by using auxiliary power. The data flushed to the nonvolatile memory device 120 may include the journal data. In an embodiment, the journal data may be programmed in a given region of the nonvolatile memory device 120 in a high-speed program manner or a single level cell (SLC) program manner.

In operation S140, the storage device 100 may be powered on. In operation S150, the storage device 100 may read the journal data from the nonvolatile memory device 120. For example, the storage controller 110 may read data from the given region of the nonvolatile memory device 120.

In operation S160, the storage device 100 may split the journal data based on the dependency of the journal data. For example, to perform the replay operation on the journal data in parallel, the journal manager 111 of the storage controller 110 may split the journal data into a plurality groups. In such case, to perform the replay operation on the journal data in parallel, there should be no dependency between journal data to be replayed at the same time or non-sequentially. In an embodiment, the dependency of the journal data may be determined based on an opcode associated with the journal data, an address of a target metadata, etc. A configuration associated with the dependency of the journal data will be described in detail with reference to the drawings.

In operation S170, the storage device 100 may replay the journal data in parallel to restore the metadata MD. For example, the journal manager 111 of the storage controller 110 may replay the journal data individually or in parallel by a split group unit.

As described above, the storage controller 110 according to an embodiment of the present disclosure may restore the metadata MD by replaying the journal data in parallel based on the dependency of the journal data. That is, the journal data may be replayed in a non-sequential order different from the order of generating the journal data (i.e., the order of updating metadata); nevertheless, the metadata MD may be normally restored. In this case, compared to the case of replaying the journal data sequentially, a time taken to restore the metadata MD may be shortened.

Figure 3:
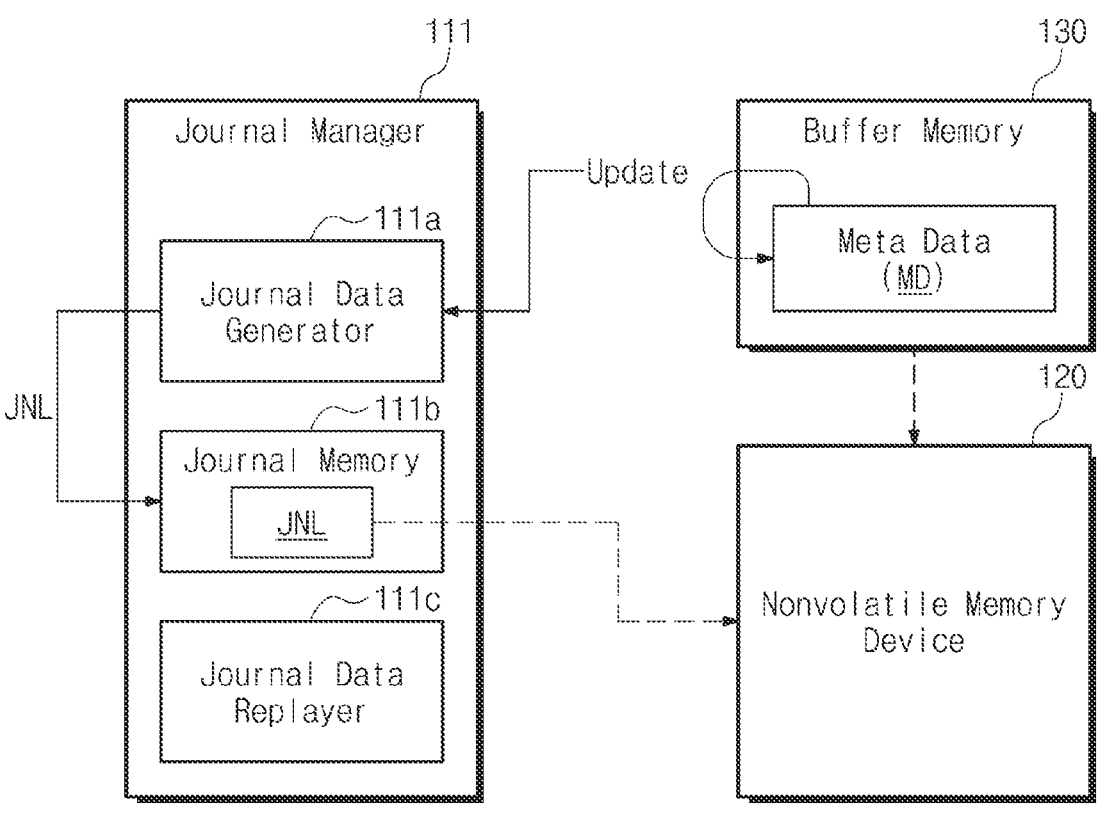
FIG. 3 is a block diagram for describing an operation in which a journal manager included in a storage controller of FIG. 1 generates journal data.
Figure 4:
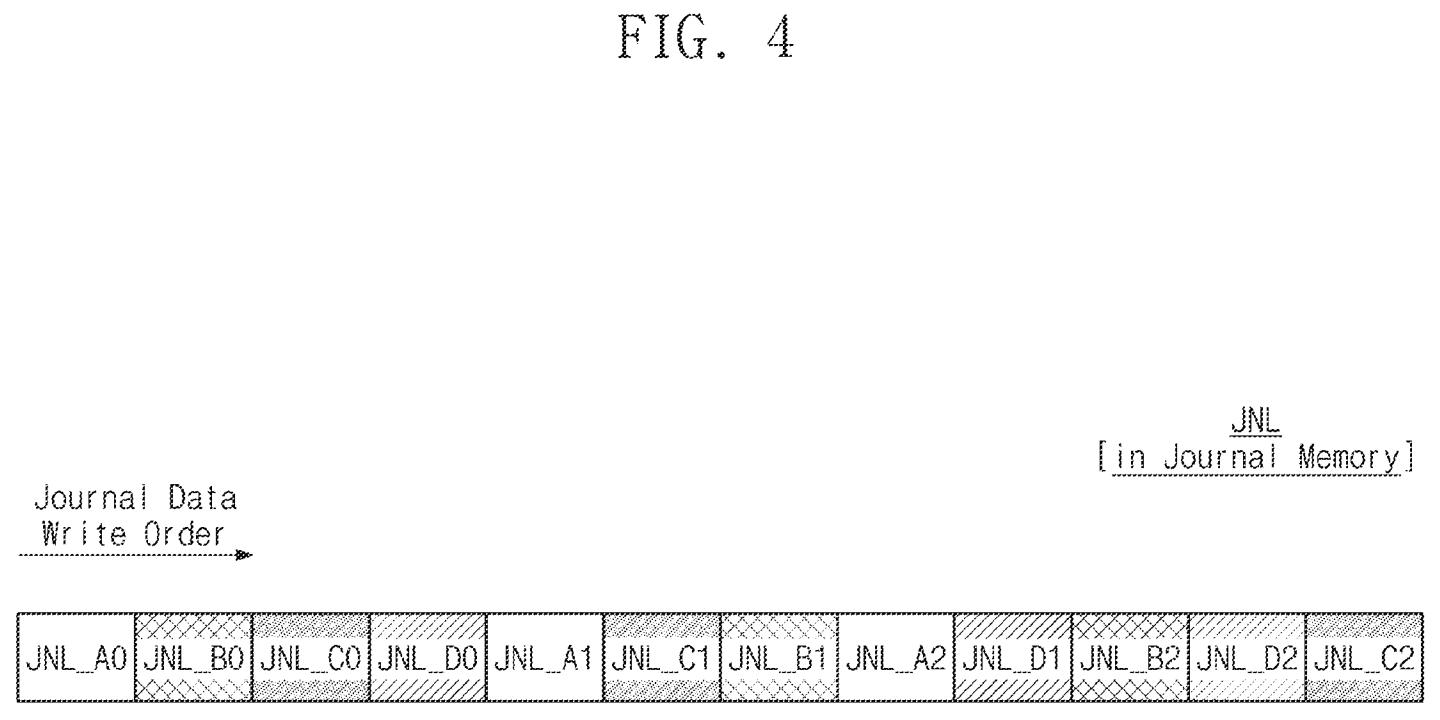
Figure 5:
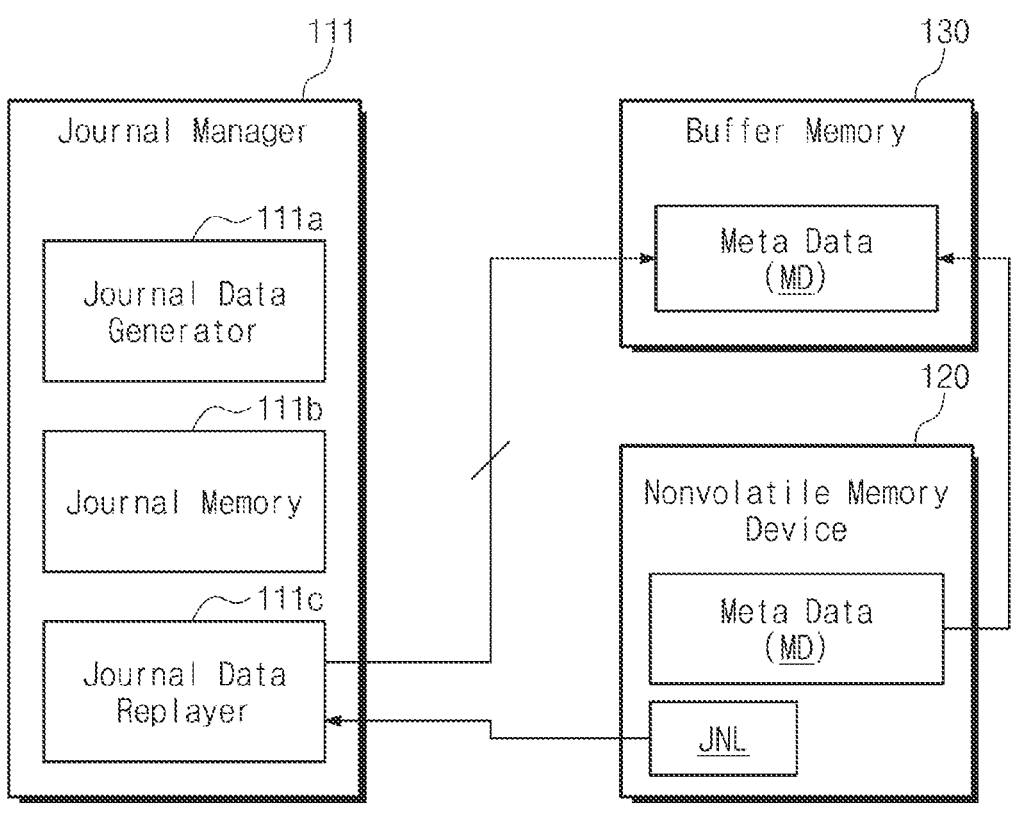
FIG. 5 is a block diagram for describing a replay operation of a journal manager included in a storage controller of FIG. 1.

FIG. 3 is a block diagram for describing an operation in which a journal manager included in a storage controller of FIG. 1 generates journal data. FIG. 4 is a diagram illustrating journal data stored in a journal memory of FIG. 3. FIG. 5 is a block diagram for describing a replay operation of a journal manager included in the storage controller of FIG. 1. For convenience of description, components that are unnecessary to describe an operation of a journal manager are omitted.

Referring to FIGS. 1 and 3 to 5, the storage controller 110 of the storage device 100 may perform various operations (e.g., a read operation, a write operation, and an erase operation) on the nonvolatile memory device 120. As various operations are performed on the nonvolatile memory device 120, the metadata MD stored in the buffer memory 130 may be updated. In an embodiment, the update of the metadata MD may be performed by a flash translation layer (FTL) included in the storage controller 110.

The journal manager 111 may manage journal data JNL based on update information of the metadata MD. For example, the journal manager 111 may include a journal data generator 111*a*, a journal memory 111*b*, and a journal data replayer 111*c*.

The journal data generator 111*a* may generate the journal data JNL based on the update information of the metadata MD. That is, the journal data JNL may include information indicating how the metadata MD is updated; in the case where partial information of the metadata MD is lost, the lost information may be restored through the journal data JNL.

The journal data JNL generated by the journal data generator 111*a* may be stored in the journal memory 111*b*. In an embodiment, the journal memory 111*b* may be an internal memory, an internal buffer, or an internal SRAM included in the storage controller 110. Alternatively, although not illustrated in drawings, the journal memory 111*b* may be implemented with a part of the buffer memory 130 located externally of the storage controller 110.

The journal memory 111*b* may accumulate and store the journal data JNL generated from the journal data generator 111*a*. For example, as illustrated in FIG. 4, as the metadata MD is updated, the journal data generator 111*a* may sequentially generate a plurality of journal data JNL_A0, JNL_B0, JNL_C0, JNL_D0 JNL_A1, JNL_C1, JNL_B1, JNL_A2, JNL_D1, JNL_B2, JNL_D2, and JNL_C2. The plurality of journal data JNL_A0, JNL_B0, JNL_C0, JNL_D0 JNL_A1, JNL_C1, JNL_B1, JNL_A2, JNL_D1, JNL_B2, JNL_D2, and JNL_C2 may be sequentially written or stored in the journal memory 111*b* based on the order of generating journal data. In an embodiment, the order of generating a plurality journal data may be associated with the order of updating the metadata MD.

In an embodiment, while the storage device 100 is driven, the metadata MD present in the buffer memory 130 may be flushed to the nonvolatile memory device 120 periodically or non-periodically (or randomly).

In an embodiment, when the sudden power-off occurs in the storage device 100, the journal data JNL present in the journal memory 111b may be flushed to the nonvolatile memory device 120. In an embodiment, in the nonvolatile memory device 120, a region in which the metadata MD and the journal data JNL are stored may be an SLC region.

The journal data replayer 111c may be configured to replay journal data for the purpose of restoring the metadata MD. For example, as illustrated in FIG. 5, when the storage device 100 is powered on after a sudden power-off, the metadata MD present in the nonvolatile memory device 120 may be loaded or stored onto the buffer memory 130. In this case, as described above, the metadata MD present in the nonvolatile memory device 120 may not be the latest version; in such a case, the reliability of data present in the nonvolatile memory device 120 is incapable of being guaranteed. Accordingly, there may be required an operation for restoring the latest version of the metadata MD.

The journal data replayer 111c of the journal manager 111 may restore the latest version of the metadata MD by replaying the journal data JNL present in the nonvolatile memory device 120. For example, the journal data replayer 111c may read the journal data JNL from the nonvolatile memory device 120. The journal data replayer 111c may restore the metadata MD by splitting the journal data JNL into a plurality of groups based on the dependency of the journal data JNL and replaying the journal data JNL individually or in parallel depending on the split groups.

Figure 6:
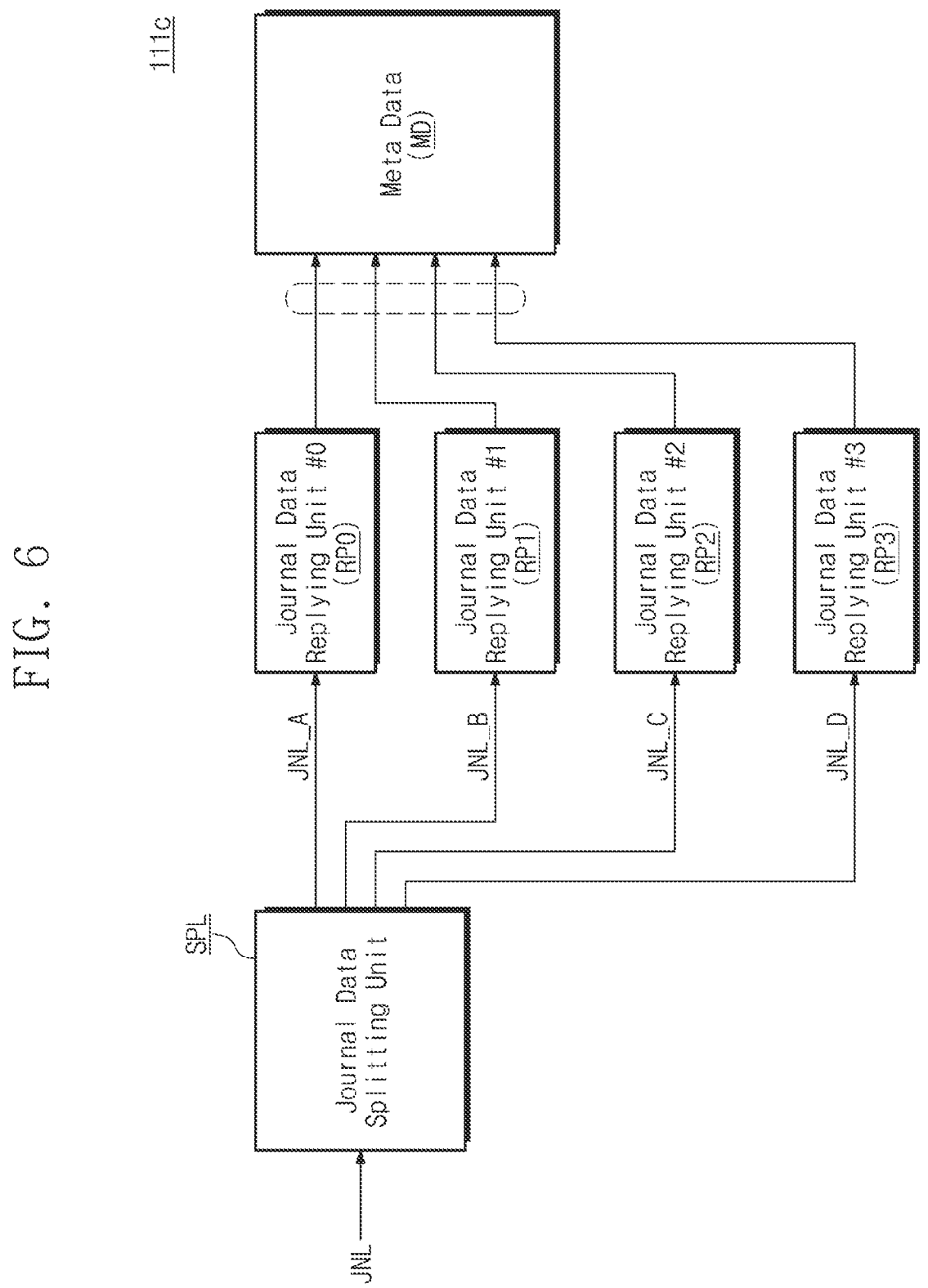
FIG. 6 is a block diagram for describing a journal data replayer of FIG. 5.

FIG. 6 is a block diagram for describing a journal data replayer of FIG. 5. Referring to FIGS. 5 and 6, the journal data replayer 111c may include a journal data splitting unit SPL and a plurality of journal data replaying units RP0 to RP3. Hereinafter, for convenience of description, the journal data replaying unit may be referred to as a "replaying unit". In an embodiment, the number of replaying units included in the journal data replayer 111c may be variously changed.

The journal data splitting unit SPL may receive the journal data JNL from the nonvolatile memory device 120. The journal data splitting unit SPL may split the journal data JNL into a plurality of groups based on the dependency of the journal data JNL. For example, it is assumed that the journal data JNL have the data structure described with reference to FIG. 4. In this case, the A-th journal data JNL_A (including JNL_A0, JNL_A1, and JNL_A2), the B-th journal data JNL_B (including JNL_B0, JNL_B1, and JNL_B2), the C-th journal data JNL_C (including JNL_C0, JNL_C1, and JNL_C2), and the D-th journal data JNL_D0 (including JNL_D0, JNL_D1, and JNL_D2) may not have the dependency mutually.

That there is no dependency between journal data may mean that the journal data are not associated with each other temporally or spatially. For example, in the case where first journal data and second journal data are spatially associated with each other and are sequentially written, the metadata MD may be normally restored only in the following manner: 1) the first journal data are first replayed, and 2) the second journal data are then replayed. In the case where the first and second journal data are replayed at the same time or in parallel or in the case where the second journal data are first replayed, the metadata MD is incapable of being restored. In this case, the first and second journal data may be determined as having the dependency mutually.

In contrast, in the case where third journal data and fourth journal data are not associated with each other temporally or spatially, the metadata MD may be normally restored by replaying the third and fourth journal data regardless of the order of replaying the third and fourth journal data. In this case, even though the third and fourth journal data are replayed at the same time or in parallel, the metadata MD may be normally restored. That is, the third and fourth journal data may be determined as having no dependency mutually.

That is, the journal data JNL of FIG. 4, the A-th journal data JNL_A (including JNL_A0, JNL_A1, and JNL_A2) may have the mutual dependency but may not have the dependency with the remaining journal data JNL_B, JNL_C, and JNL_D; the B-th journal data JNL_B (including JNL_B0, JNL_B1, and JNL_B2) may have the mutual dependency but may not have the dependency with the remaining journal data JNL_A, JNL_C, and JNL_D; the C-th journal data JNL_C (including JNL_C0, JNL_C1, and JNL_C2 may have the mutual dependency but may not have the dependency with the remaining journal data JNL_A, JNL_B, and JNL_D; the D-th journal data JNL_D (including JNL_D0, JNL_D1, and JNL_D2) may have the mutual dependency but may not have the dependency with the remaining journal data JNL_A, JNL_B, and JNL_C.

In an embodiment, the dependency between journal data may be determined based on an opcode indicating an operation of journal data or an address.

The A-th journal data JNL_A split by the journal data splitting unit SPL may be provided to the 0-th replaying unit RP0; the B-th journal data JNL_B split by the journal data splitting unit SPL may be provided to the first replaying unit RP1; the C-th journal data JNL_C split by the journal data splitting unit SPL may be provided to the second replaying unit RP2; the D-th journal data JNL_D split by the journal data splitting unit SPL may be provided to the third replaying unit RP3.

The 0-th to third replaying units RP0 to RP3 may respectively replay the A-th to D-th journal data JNL_A, JNL_B, JNL_C, and JNL_D individually or in parallel, and thus, the metadata MD may be restored. In an embodiment, as described above, because the A-th to D-th journal data JNL_A, JNL_B, JNL_C, and JNL_D have no dependency mutually, even though the A-th to D-th journal data JNL_A, JNL_B, JNL_C, and JNL_D are replayed at the same time or in parallel, the metadata MD may be normally restored.

In an embodiment, journal data with the dependency may be replayed by one replaying unit depending on a given order. For example, the A-th journal data JNL_A (including JNL_A0, JNL_A1, and JNL_A2) may be replayed by the 0-th replaying unit RP0. In this case, the A-th journal data JNL_A (including JNL_A0, JNL_A1, and JNL_A2) may be replayed depending on the written order (i.e., JNL_A0→JNL_A1→JNL_A2).

Figure 7:
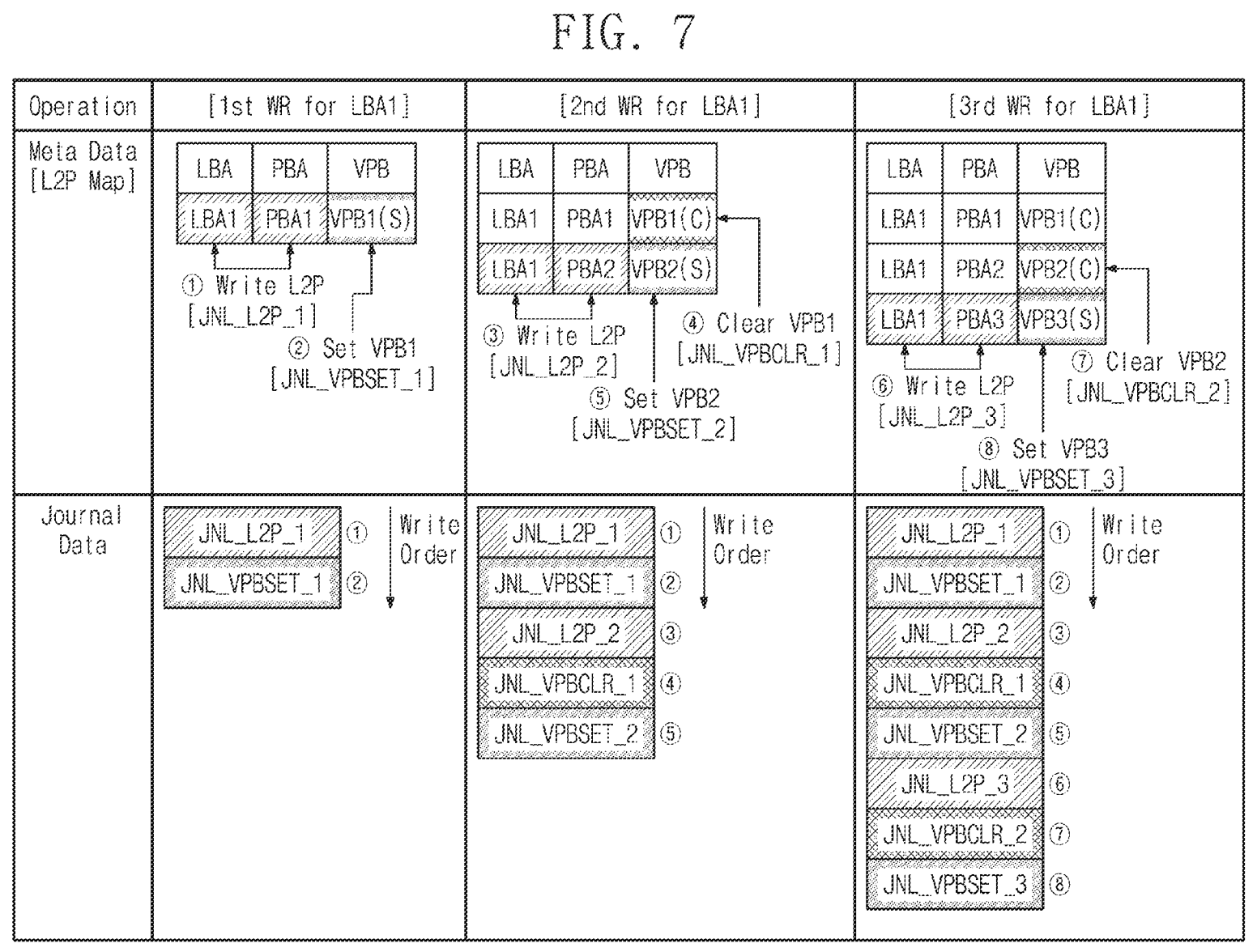

FIG. 7 is a diagram for describing a configuration of journal data managed by a journal manager of FIG. 3 in detail. To describe an embodiment of the present disclosure clearly, it is assumed that the storage device 100 repeatedly performs the write operation for a first logical block address LBA1 depending on a request of the host 11 or under control of the host 11.

For example, referring to FIGS. 1 and 7, the storage device 100 may perform a first write operation (1st WR) for the first logical block address LBA1 depending on the request of the host 11. In this case, the storage controller 110 of the storage device 100 may allocate or map a first physical block address PBA1 of the nonvolatile memory device 120 to the first logical block address LBA1. In addition, the storage controller 110 may write information about the first logical block address LBA1 and the first physical block address PBA1 in a mapping table L2P Map being the metadata MD and may set first valid information VPB1 (marked by "S" in FIG. 7). That is, after the first write operation for the first logical block address LBA1 is completed, the mapping table L2P Map being the metadata MD may include the correspondence information of the first logical block address LBA1 and the first physical block address PBA1 and the first valid information VPB1.

The journal manager 111 may be configured to write the update information of the metadata MD described above. For example, the journal manager 111 may generate, as journal data, first mapping journal data JNL_L2P_1 associated with the update operation (i.e., Write L2P) of writing the correspondence information of the first logical block address LBA1 and the first physical block address PBA1. Afterwards, the journal manager 111 may generate, journal data, first valid set journal data JNL_VPBSET_1 associated with the update operation (i.e., Set_VPB1) of setting the first valid information VPB1 indicating validity of the correspondence information of the first logical block address LBA1 and the first physical block address PBA1.

The first mapping journal data JNL_L2P_1 and the first valid set journal data JNL_VPBSET_1 may be stored in the journal memory 111b sequentially or in order.

Afterwards, the storage device 100 may perform the second write operation (2nd WR) for the first logical block address LBA1. In this case, the storage controller 110 may allocate or map a second physical block address PBA2 of the nonvolatile memory device 120 to the first logical block address LBA1.

In addition, the storage controller 110 may write information about the first logical block address LBA1 and the second physical block address PBA2 in the mapping table L2P Map being the metadata MD, may clear the first valid information VPB1 (marked by "C" in FIG. 7), and may set second valid information VPB2. That is, after the second write operation for the first logical block address LBA1 is completed, the mapping table L2P Map being the metadata MD may include the correspondence information of the first logical block address LBA1 and the first physical block address PBA1, the first valid information VPB1, correspondence information of the first logical block address LBA1 and the second physical block address PBA2, and the second valid information VPB2. In this case, because the first valid information VPB1 is cleared (C) and the second valid information VPB2 is set (S), after the second write operation is completed, the access to the first logical block address LBA1 may be performed based on the second physical block address PBA2.

As in the above description, the journal manager 111 may be configured to write the update information of the metadata MD described above. For example, the journal manager 111 may generate, as journal data, second mapping journal data JNL_L2P_2 associated with the update operation (i.e., Write L2P) of writing the correspondence information of the first logical block address LBA1 and the second physical block address PBA2. Afterwards, the journal manager 111 may generate, journal data, first valid clear journal data JNL_VPBCLR_1 associated with the update operation (i.e., Clear_VPB1) of clearing the first valid information VPB1 indicating the validity of the correspondence information of the first logical block address LBA1 and the first physical block address PBA1. Afterwards, the journal manager 111 may generate, journal data, second valid set journal data JNL_VPBSET_2 associated with the update operation (i.e., Set_VPB2) of setting the second valid information VPB2 indicating validity of the correspondence information of the first logical block address LBA1 and the second physical block address PBA2.

The second mapping journal data JNL_L2P_2, the first valid clear journal data JNL_VPBCLR_1, and the second valid set journal data JNL_VPBSET_2 may be stored in the journal memory 111b sequentially or in order.

Afterwards, the storage device 100 may perform a third write operation (3rd WR) for the first logical block address LBA1. In the third write operation (3rd WR), the storage controller 110 may allocate or map a third physical block address PBA3 of the nonvolatile memory device 120 to the first logical block address LBA1. In this case, as described above, an operation (i.e., Write L2P) of writing correspondence information of the first logical block address LBA1 and the third physical block address PBA3 in the mapping table L2P Map, an operation (i.e., Clear_VPB2) of clearing the second valid information VPB2, and an operation (i.e., Set_VPB3) of setting third valid information VPB3 may be performed.

The journal manager 111 may be configured to write the update information of the metadata MD described above. For example, the journal manager 111 may generate, as journal data, third mapping journal data JNL_L2P_3 associated with the update operation (i.e., Write L2P) of writing the correspondence information of the first logical block address LBA1 and the third physical block address PBA3. Afterwards, the journal manager 111 may generate, journal data, second valid clear journal data JNL_VPBCLR_2 associated with the update operation (i.e., Clear_VPB2) of clearing the second valid information VPB2 indicating the validity of the correspondence information of the first logical block address LBA1 and the second physical block address PBA2. Afterwards, the journal manager 111 may generate, journal data, third valid set journal data JNL_VPBSET_3 associated with the update operation (i.e., Set_VPB3) of setting the third valid information VPB3 indicating validity of the correspondence information of the first logical block address LBA1 and the third physical block address PBA3.

The third mapping journal data JNL_L2P_3, the second valid clear journal data JNL_VPBCLR_2, and the third valid set journal data JNL_VPBSET_3 may be stored in the journal memory 111b sequentially or in order.

As described above, the journal manager 111 may generate the journal data JNL associated with the update of the metadata MD, and the generated journal data JNL may be stored in the journal memory 111b sequentially (e.g., in the order of updating the metadata MD).

In an embodiment, when a sudden power-off occurs in the storage device 100, the journal data JNL present in the journal memory 111b may be flushed to the nonvolatile memory device 120.

Figure 8:
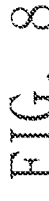
FIG. 8 is a diagram for describing a configuration in which journal data are replayed in parallel by a journal manager of FIG. 5 in detail.

FIG. 8 is a diagram for describing a configuration in which journal data is replayed in parallel by a journal manager of FIG. 5 in detail. For convenience of description, it is assumed that the journal data JNL that are replayed by the journal manager 111 is the journal data JNL described with reference to FIG. 7.

Referring to FIGS. 1, 5, 7, and 8, the journal data replayer 111c of the journal manager 111 may read the journal data JNL from the nonvolatile memory device 120 and may replay the journal data JNL in parallel based on the dependency of the journal data JNL.

For example, the journal data splitting unit SPL may split the journal data JNL based on the dependency of the journal data JNL. In detail, the journal data JNL flushed in the nonvolatile memory device 120 in a sudden power-off may include the following journal data: JNL_L2P_1, JNL_VPB-SET_1, JNL_L2P_2, JNL_VPBCLR_1, JNL_VPBSET_2, JNL_L2P_3, JNL_VPBCLR_2, and JNL_VPBSET_3. In this case, the journal data splitting unit SPL may classify the journal data JNL_L2P_1, JNL_L2P_2, and JNL_L2P_3 as a first group, may classify the journal data JNL_VPBSET_1 and JNL_VPBCLR_1 as a second group, may classify the journal data JNL_VPBSET_2 and JNL_VPBCLR_2 as a third group, and may classify the journal data JNL_VPB-SET_3 as a fourth group.

In the above split of the journal data, the journal data of each group may not have the dependency mutually. For example, although the journal data (e.g., JNL_L2P_1, JNL_L2P_2, and JNL_L2P_3) of the first group and the journal data (e.g., JNL_VPBSET_1 and JNL_VPBCLR_1) of the second group are replayed at the same time or in parallel, the metadata MD may be normally restored. In contrast, when the journal data (e.g., JNL_VPBSET_1 and JNL_VPBCLR_1) of the second group are replayed at the same time or in parallel, a final value of the second valid information VPB2 may correspond to a set (S) state, which is different from an actual state of the second valid information VPB2.

That is, the journal data splitting unit SPL may split the journal data into a plurality of groups based on the dependency of the journal data. In an embodiment, the dependency of the journal data may be determined based on information included in the journal data, such as an opcode or an address.

The journal data JNL split into the plurality of groups by the journal data splitting unit SPL may be respectively provided to the plurality of replaying units RP0 to RP3. Each of the plurality of replaying units RP0 to RP3 may restore the metadata MD based on the received journal data JNL.

For example, the 0-th replaying unit RP0 may receive the journal data (e.g., JNL_L2P_1, JNL_L2P_2, and JNL_L2P_3) of the first group and may update L2P information (i.e., correspondence information of a logical block address and a physical block address) of the metadata MD based on the received journal data.

The first replaying unit RP1 may receive the journal data (e.g., JNL_VPBSET_1 and JNL_VPBCLR_1) of the second group and may update the first valid information VPB1 of the metadata MD based on the received journal data.

The second replaying unit RP2 may receive the journal data (e.g., JNL_VPBSET_2 and JNL_VPBCLR_2) of the third group and may update the second valid information VPB2 of the metadata MD based on the received journal data.

The third replaying unit RP3 may receive the journal data (e.g., JNL_VPBSET_3) of the fourth group and may update the third valid information VPB3 of the metadata MD based on the received journal data.

A conventional journal data replayer replays journal data one by one sequentially depending on the order of generating or writing the journal data. In this case, a speed at which the metadata MD is restored may be relatively slow. In contrast, as described above, the journal data replayer 111c according to an embodiment of the present disclosure may include the plurality of replaying units RP0 to RP3 and may replay the journal data JNL in parallel through the replaying units RP0 to RP3 based on the dependency of the journal data JNL. In this case, because the journal data is replayed at the same time or in parallel by the plurality of replaying units RP0 to RP3, an operating speed at which the metadata MD is restored may be improved.

Figure 9:
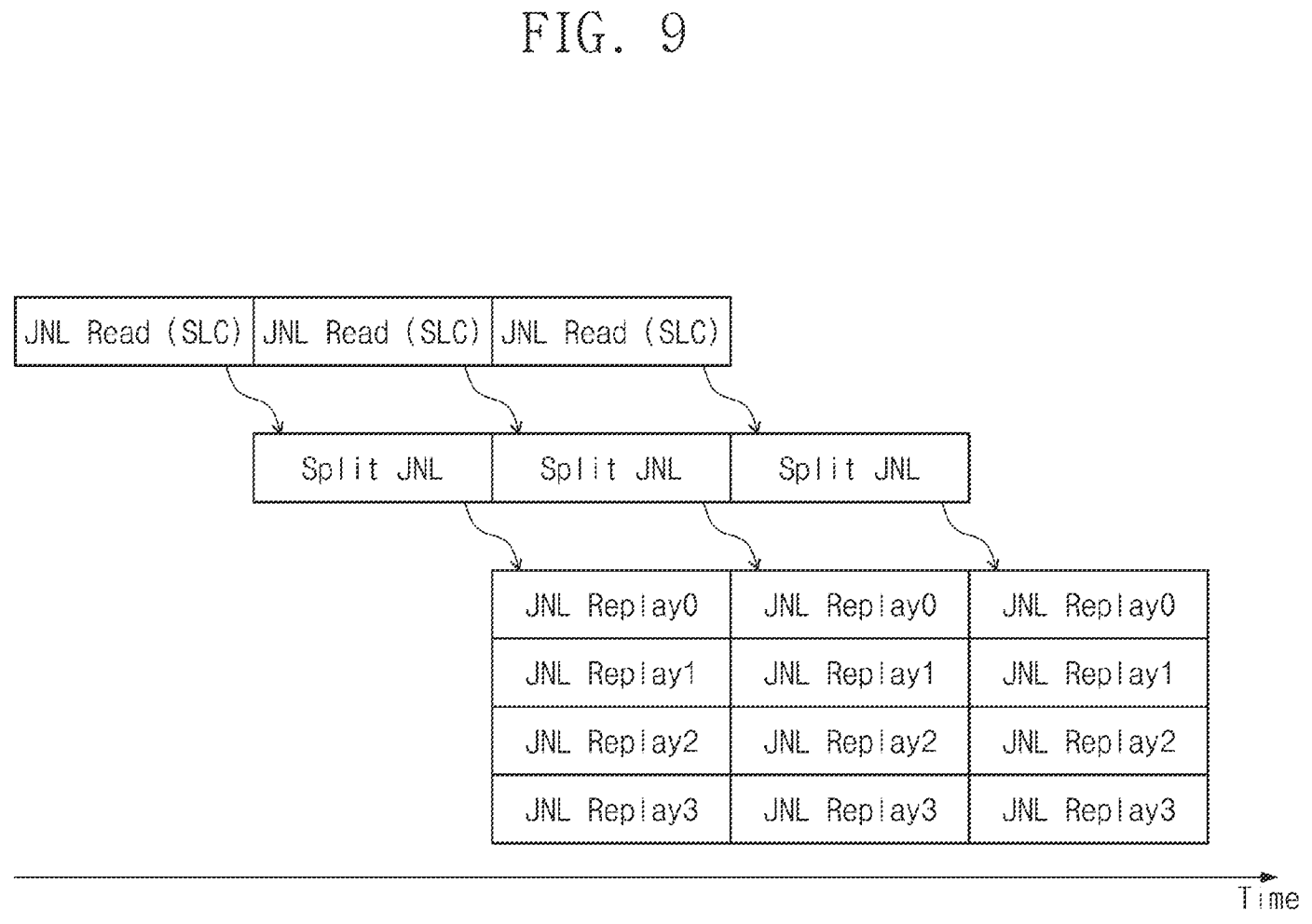

FIG. 9 is a timing diagram for describing an operation of a journal data replayer of FIG. 6. Referring to FIGS. 6 and 9, the journal data replayer 111c may read the journal data JNL from the nonvolatile memory device 120. In an embodiment, the operation of reading the journal data JNL from the nonvolatile memory device 120 may be performed in an SLC read manner. The journal data replayer 111c may split the read journal data JNL into a plurality of groups. Next, the journal data replayer 111c may replay the journal data JNL in parallel by using the plurality of replaying units RP0 to RP3.

In this case, as illustrated in FIG. 9, the journal data read operation, the journal data split operation, and the journal data replay operation of the journal data replayer 111c may be performed in a pipeline manner, and thus, a metadata restoration speed may be improved.

Figures 10, 11:
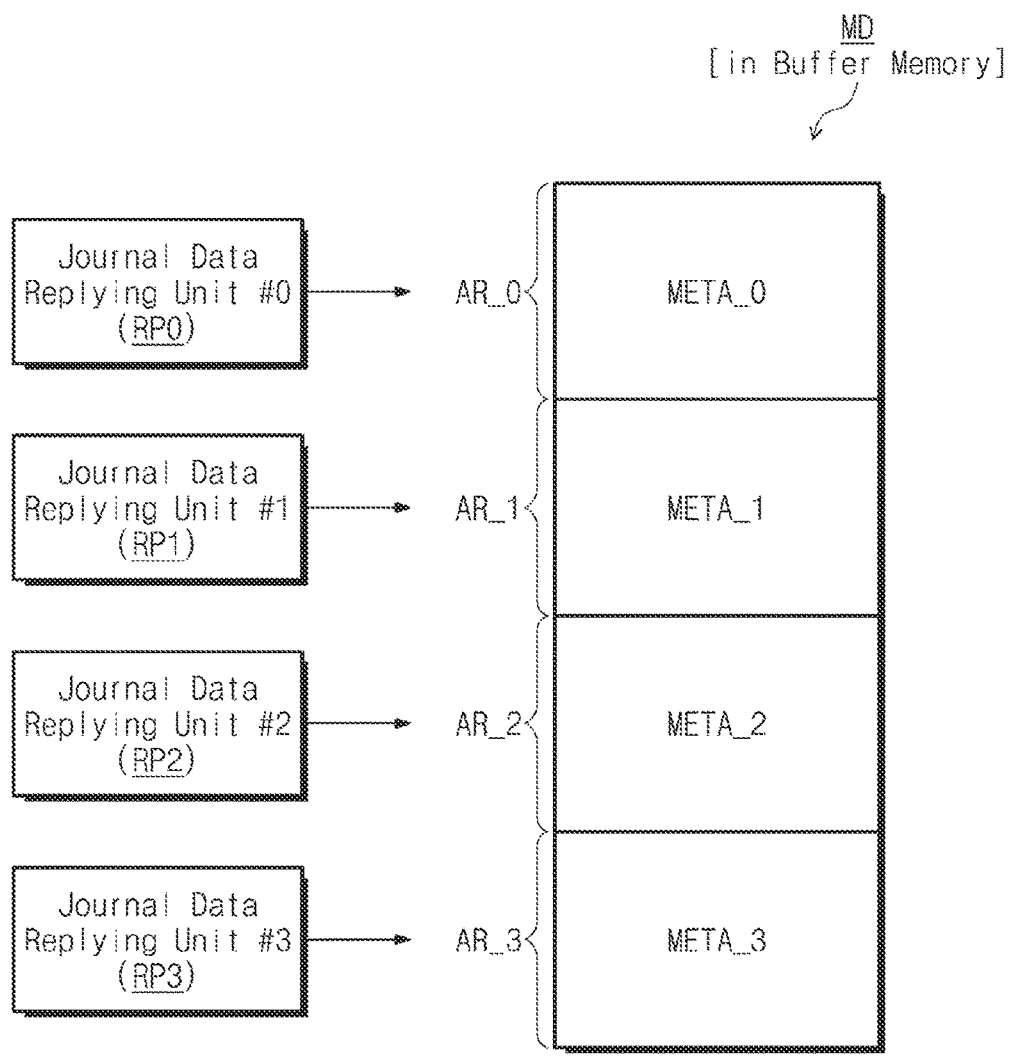
FIG. 10 is a diagram illustrating a format of journal data according to an embodiment of the present disclosure.
FIG. 11 is a diagram for describing an operation in which journal data are replayed in parallel based on a journal address field of the journal data of FIG. 10.

FIG. 10 is a diagram illustrating a format of journal data according to an embodiment of the present disclosure. FIG. 11 is a diagram for describing an operation in which journal data is replayed in parallel based on a journal address field of journal data of FIG. 10.

In an embodiment, the format of the journal data JNL illustrated in FIG. 10 is only an example, and the present disclosure is not limited thereto. The format of the journal data JNL may be variously changed or modified. Referring to FIGS. 10 and 11, the journal data JNL may include a journal opcode field, a journal address field, and a data field.

The journal opcode field may include information about an operation that is updated in replaying the journal data JNL. The journal address field may indicate a location (e.g., a location of the buffer memory 130) of updated metadata in replaying the journal data JNL. The data field may indicate a value that is updated in replaying the journal data JNL.

In an embodiment, the splitting manner of the journal data splitting unit SPL described with reference to FIG. 8 may be performed based on the journal opcode field of the journal data JNL. For example, the journal data splitting unit SPL may check the journal opcode field of the journal data JNL read from the nonvolatile memory device 120 and may split the journal data JNL into a plurality of groups based on the journal opcode field.

In an embodiment, the journal data splitting unit SPL may split the journal data JNL into the plurality of groups based on the journal address field of the journal data JNL. For example, as illustrated in FIG. 11, the metadata MD may be stored or managed within a given address range of the buffer memory 130. The given address range of the buffer memory 130 may include 0-th to third address ranges AR_0, AR_1, AR_2, and AR_3.

When the journal data JNL is replayed, data or information of the metadata MD, which is included in the 0-th address range AR_0, may be updated by the 0-th replaying unit RP0; data or information of the metadata MD, which is included in the first address range AR_1, may be updated by the first replaying unit RP1; data or information of the metadata MD, which is included in the second address range AR_2, may be updated by the second replaying unit RP2; data or information of the metadata MD, which is included in the third address range AR_3, may be updated by the third replaying unit RP3.

In this case, because the metadata MD respectively included in the 0-th to third address ranges AR_0, AR_1, AR_2, and AR_3 are distinguished from each other physically or logically, the metadata MD may be normally restored even though updated in parallel. That is, journal data respectively corresponding to the 0-th to third address ranges AR_0, AR_1, AR_2, and AR_3 do not have the dependency mutually. In detail, when the journal address field of the first journal data is included in the first address range AR_1 and the journal address field of the second journal data is included in the second address range AR_2, there may be no dependency between the first journal data and the second journal data, and thus, the first journal data and the second journal data may be replayed at the same time or in parallel.

The journal data splitting unit SPL may determine the dependency between journal data based on various characteristics and attributes of the journal data described above and may provide the journal data to different replaying units such that the journal data having no mutual dependency are replayed at the same time or in parallel.

Figure 12:
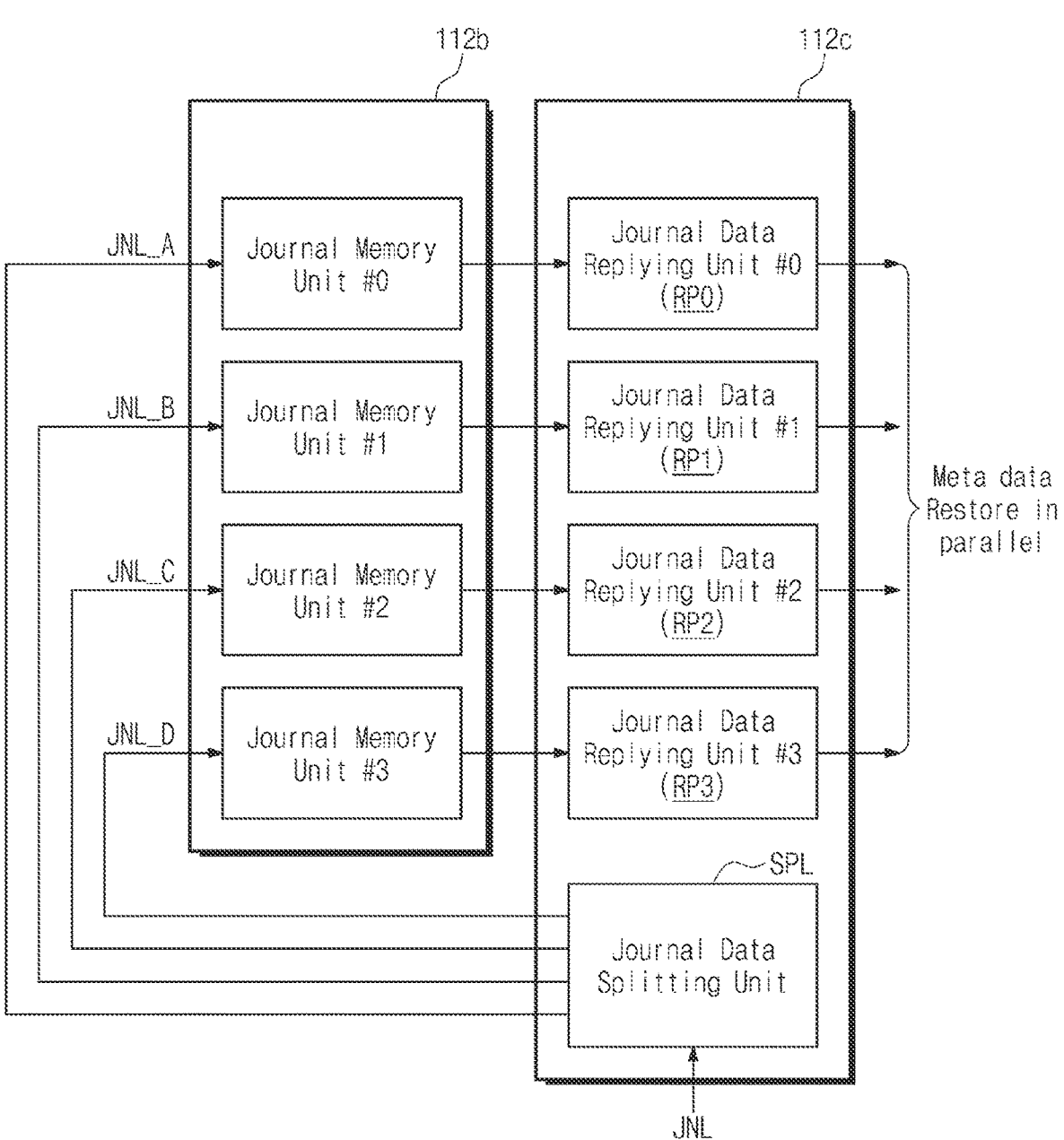
FIG. 12 is a diagram for describing an operation of a journal data replayer of FIG. 5.

FIG. 12 is a diagram for describing an operation of a journal data replayer of FIG. 5. In the above embodiments, the description is given as the journal data splitting unit SPL splits the journal data JNL based on the dependency of the journal data JNL and provides the journal data of the groups to the plurality of replaying units RP0 to RP3, respectively. However, the present disclosure is not limited thereto.

For example, as illustrated in FIG. 12, the journal data replayer 111c may include the journal data splitting unit SPL and the plurality of replaying units RP0 to RP3. The journal data splitting unit SPL may receive the journal data JNL from the nonvolatile memory device 120. The journal data splitting unit SPL may split the journal data JNL into a plurality of groups based on the methods described with reference to FIGS. 1 to 11.

The journal memory 111b may be divided into a plurality of journal memory units JM0 to JM3. The plurality of journal memory units JM0 to JM3 may indicate memory regions distinguished from each other physically or logically within the journal memory 111b. The journal data split by the journal data splitting unit SPL may be stored in a corresponding journal memory unit of the plurality of journal memory units JM0 to JM3. For example, the A-th journal data JNL_A classified as the first group may be stored in the 0-th journal memory unit JM0; the B-th journal data JNL_B classified as the second group may be stored in the first journal memory unit JM1; the C-th journal data JNL_C classified as the third group may be stored in the second journal memory unit JM2; the D-th journal data JNL_D classified as the fourth group may be stored in the third journal memory unit JM3.

Each of the plurality of replaying units RP0 to RP3 of the journal data replayer 111c may be configured to replay journal data stored in the corresponding one of the journal memory units JM0, JM1, JM2, and JM3. For example, the 0-th replaying unit RP0 may sequentially replay the A-th journal data JNL_A stored in the 0-th journal memory unit JM0; the first replaying unit RP1 may sequentially replay the B-th journal data JNL_B stored in the first journal memory unit JM1; the second replaying unit RP2 may sequentially replay the C-th journal data JNL_C stored in the second journal memory unit JM2; the third replaying unit RP3 may sequentially replay the D-th journal data JNL_D stored in the third journal memory unit JM3.

Figure 13:
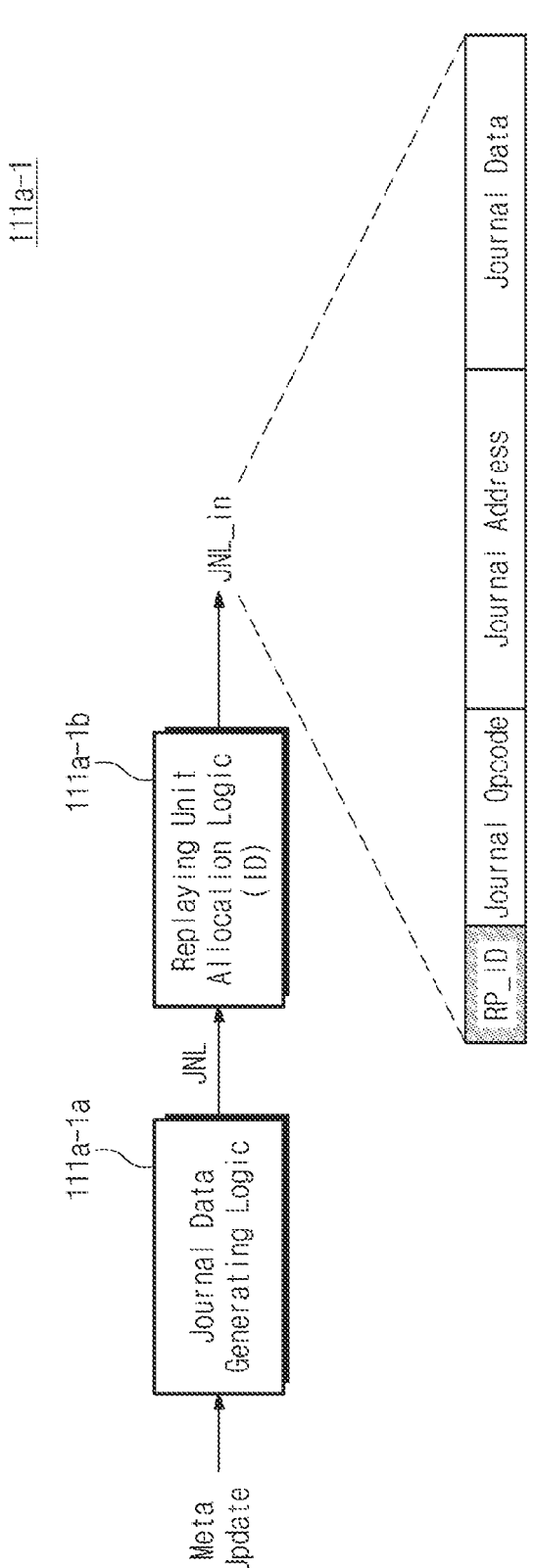
FIG. 13 is a block diagram for describing an operation of a journal data generator of FIG. 3.

FIG. 13 is a block diagram for describing an operation of a journal data generator of FIG. 3. Referring to FIGS. 1, 3, and 13, a journal data generator 111a-1 of the journal manager 111 may include journal data generating logic 111a-1a and replaying unit allocation logic 111a-1b. The journal data generating logic 111a-1a may generate the journal data JNL based on update information of metadata. In an embodiment, the journal data JNL generated by the journal data generating logic 111a-1a may have the format of FIG. 10, but the present disclosure is not limited thereto. For example, the journal data JNL generated by the journal data generating logic 111a-1a may have various formats.

In the above embodiments, the generated journal data JNL are stored in the journal memory 111b. In contrast, in the embodiment of FIG. 13, before the generated journal data JNL are stored in the journal memory 111b, the generated journal data JNL are provided to the replaying unit allocation logic 111a-1b. The replaying unit allocation logic 111a-1b may allocate a replaying unit, which will replay the journal data JNL later, based on the dependency of the journal data JNL. The replaying unit is allocated to the journal data JNL through an operation and a configuration that are similar to the operation and the configuration of the journal data splitting unit SPL described above, and thus, additional description will be omitted to avoid redundancy.

The replaying unit allocation logic 111a-1b may generate internal journal data JNL_in by adding an identifier field RP_ID including information about the allocated replaying unit to the journal data JNL. The internal journal data JNL_in may be stored in the journal memory 111b. In this case, when the journal data JNL are replayed later, the journal data splitting unit SPL may split the journal data JNL by checking the identifier field RP_ID.

That is, according to the embodiment of FIG. 13, the journal manager 111 may allocate in advance a replaying unit, which will replay journal data later, based on the dependency of the journal data in the process of generating the journal data and may add the identifier field RP_ID including information about the allocated replaying unit to the journal data JNL. Afterwards, when the journal data JNL is replayed, the journal manager 111 may provide the journal data JNL to a replaying unit allocated to the journal data JNL from among a plurality of replaying units, based on a result of checking the identifier field RP_ID of the journal data JNL. As such, the journal data may be replayed in parallel.

Figure 14:
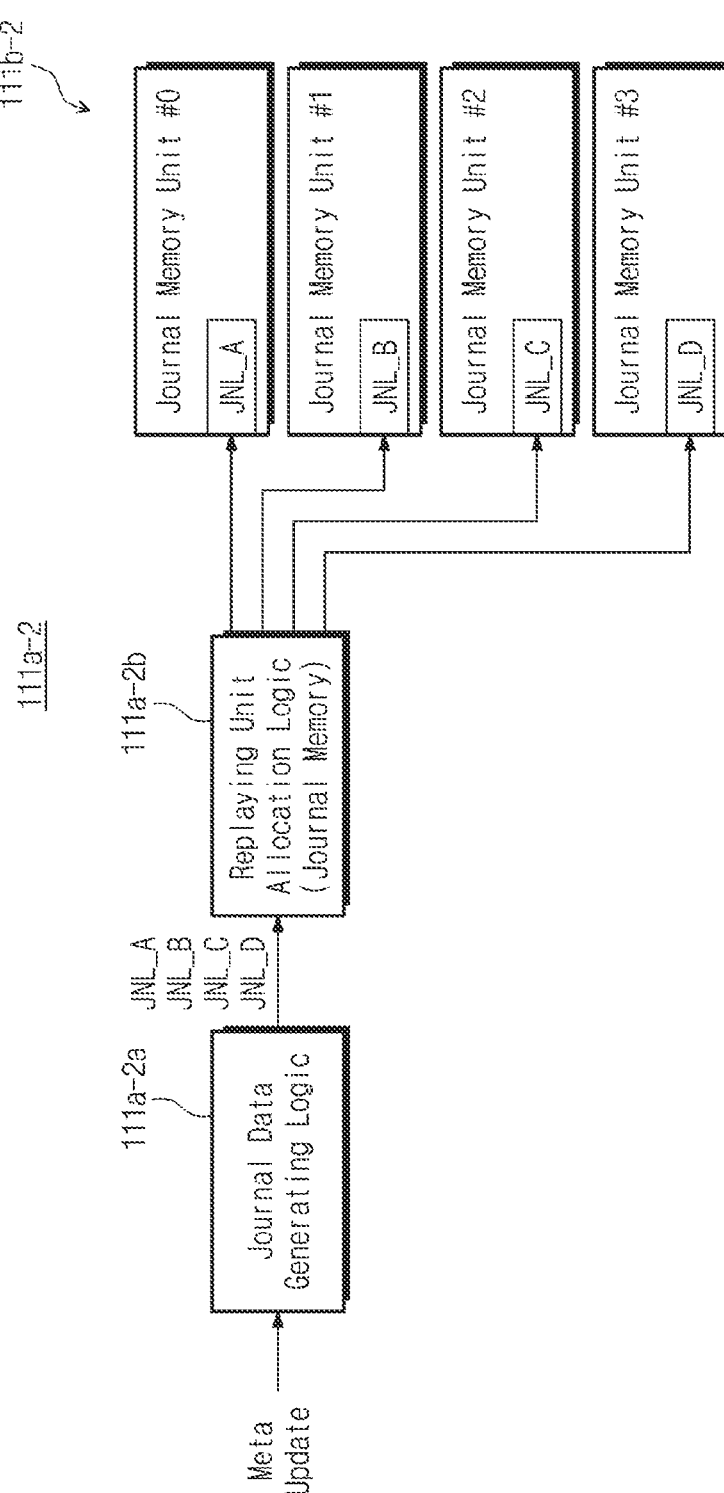
FIG. 14 is a block diagram for describing an operation of a journal data generator of FIG. 3.

FIG. 14 is a block diagram for describing the operation of a journal data generator of FIG. 3. Referring to FIGS. 1, 3, and 14, a journal data generator 111a-2 may include journal data generating logic 111a-2a and replaying unit allocation logic 111a-2b. The journal data generating logic 111a-2a is similar to the journal data generating logic 111a-1a described with reference to FIG. 13, and thus, additional description will be omitted to avoid redundancy.

The replaying unit allocation logic 111a-2b may allocate a replaying unit, which will replay the journal data JNL later, based on the dependency of the journal data JNL. The replaying unit is allocated to the journal data JNL through an operation and a configuration that are similar to the operation and the configuration of the journal data splitting unit SPL described above, and thus, additional description will be omitted to avoid redundancy.

The replaying unit allocation logic 111a-2b may store journal data in a journal memory unit corresponding to a replaying unit allocated to the journal data. For example, the journal data generating logic 111a-2a may generate the A-th, B-th, C-th, and D-th journal data JNL_A, JNL_B, JNL_C, and JNL_D. The A-th, B-th, C-th, and D-th journal data JNL_A, JNL_B, JNL_C, and JNL_D may be journal data having no mutual dependency. In this case, the replaying unit allocation logic 111a-2b may allocate the A-th journal data JNL_A to the 0-th replaying unit RP0, may allocate the B-th journal data JNL_B to the first replaying unit RP1, may allocate the C-th journal data JNL_C to the second replaying unit RP2, and may allocate the D-th journal data JNL_D to the third replaying unit RP3.

The replaying unit allocation logic 111a-2b may store the A-th journal data JNL_A in the 0-th journal memory unit JM0 of a journal memory 111b-2, may store the B-th journal data JNL_B in the first journal memory unit JM1 of the journal memory 111b-2, may store the C-th journal data JNL_C in the second journal memory unit JM2 of the journal memory 111b-2, and may store the D-th journal data JNL_D in the third journal memory unit JM3 of the journal memory 111b-2. The 0-th to third journal memory units JM0 to JM3 may be memory regions distinguished from each other physically or logically in the journal memory 111b-2.

As described above, replaying unit allocation logic may store journal data in different journal memory units depending on replaying units respectively allocated to the journal data. In an embodiment, the journal data JNL stored in the journal memory 111b-2 through the operation of FIG. 14 may be flushed to the nonvolatile memory device 120.

Figure 15:
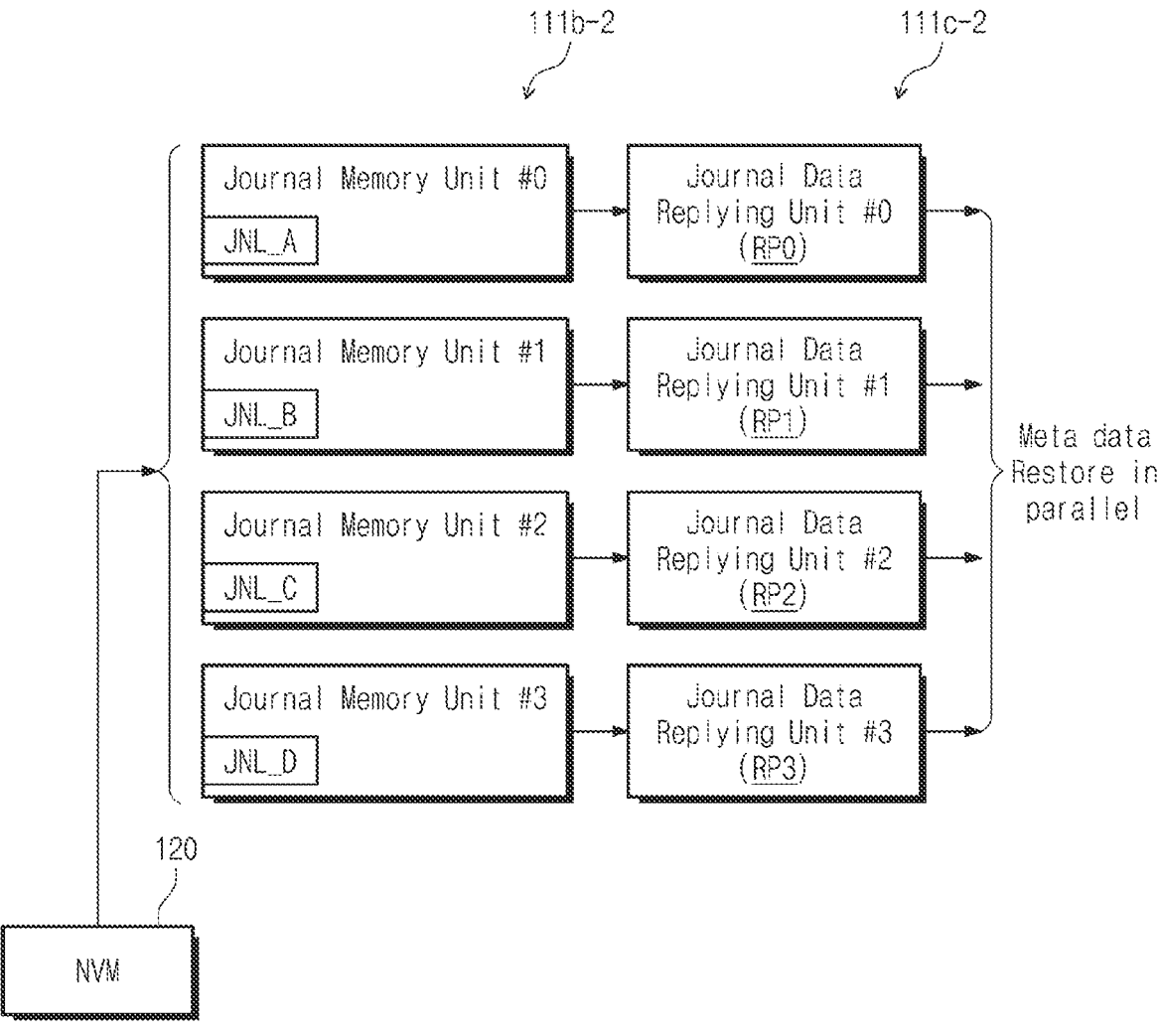
FIG. 15 is a diagram for describing how journal data generated by a journal data generator of FIG. 14 is replayed.

FIG. 15 is a diagram for describing how journal data generated by the journal data generator of FIG. 14 are replayed. Referring to FIGS. 1, 3, 14, and 15, the journal data JNL present in the nonvolatile memory device 120 may be loaded onto the journal memory 111b-2. In an embodiment, the journal data JNL_A, JNL_B, JNL_C, and JNL_D may be loaded at locations of the journal memory 111b-2, which are the same as the locations where the journal data JNL_A, JNL_B, JNL_C, and JNL_D are stored by the replaying unit allocation logic 111a-2b. For example, like the manner in which journal data are stored by the replaying unit allocation logic 111a-2b, the A-th journal data JNL_A read from the nonvolatile memory device 120 may be loaded onto the 0-th journal memory unit JM0; the B-th journal data JNL_B read from the nonvolatile memory device 120 may be loaded onto the first journal memory unit JM1; the C-th journal data JNL_C read from the nonvolatile memory device 120 may be loaded onto the second journal memory unit JM2; the D-th journal data JNL_D read from the nonvolatile memory device 120 may be loaded onto the third journal memory unit JM3.

In an embodiment, the above way to load the journal data JNL may be accomplished by flushing and loading the entire journal data present in the journal memory 111b-2 in the form of a packet or an image.

Afterwards, the A-th journal data JNL_A loaded onto the 0-th journal memory unit JM0 may be replayed by the 0-th replaying unit RP0; the B-th journal data JNL_B loaded onto the first journal memory unit JM1 may be replayed by the first replaying unit RP1; the C-th journal data JNL_C loaded onto the second journal memory unit JM2 may be replayed by the second replaying unit RP2; the D-th journal data JNL_D loaded onto the third journal memory unit JM3 may be replayed by the third replaying unit RP3. Accordingly, the parallel replay of journal data may be accomplished.

Figure 16:
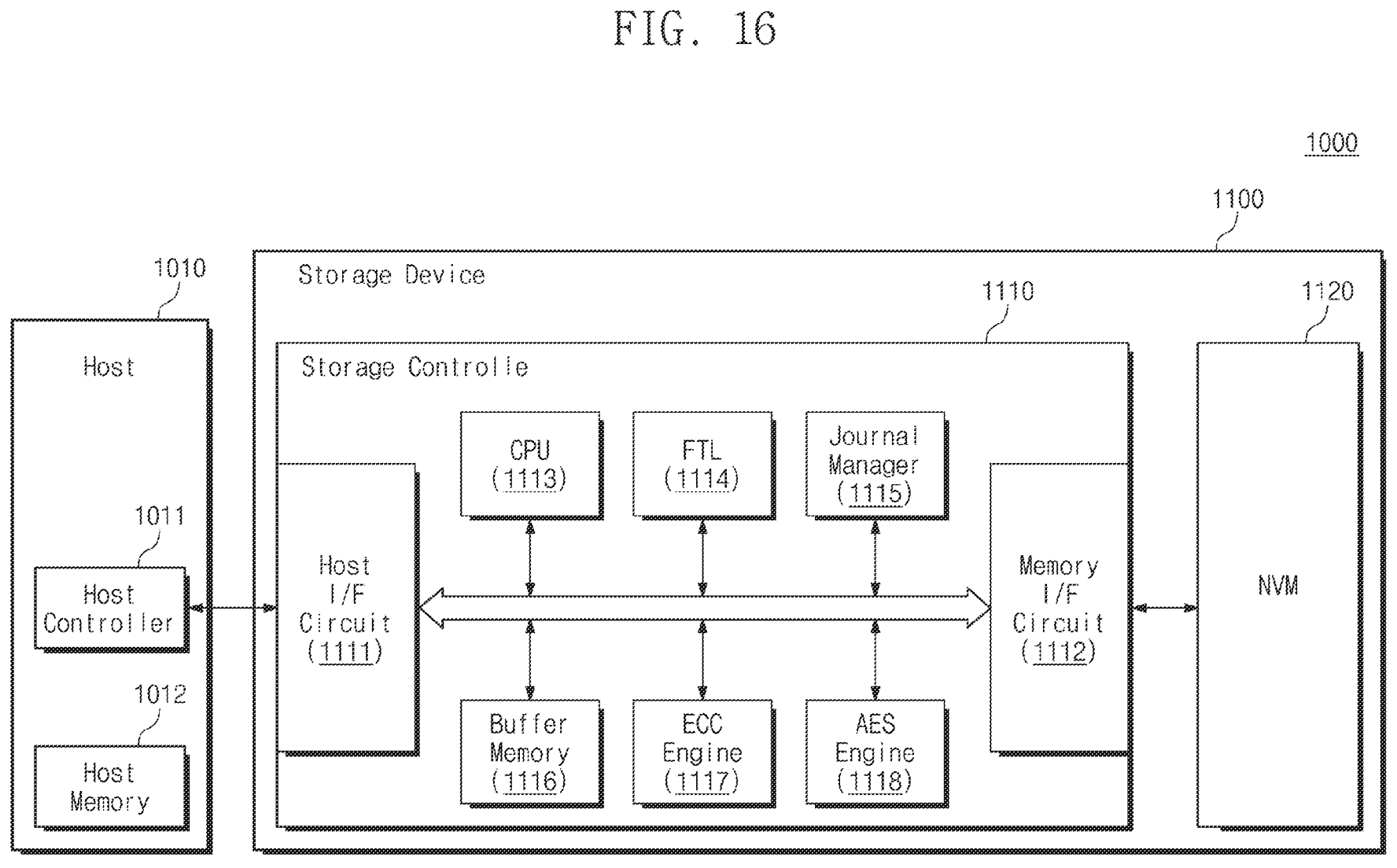

FIG. 16 is a block diagram illustrating a host-storage system according to an embodiment of the present disclosure. Referring to FIG. 16, a host-storage system 1000 may include a host 1010 and a storage device 1100. Also, the storage device 1100 may include a storage controller 1110 and a nonvolatile memory (NVM) 1120. Also, according to an embodiment of the present disclosure, the host 1010 may include a host controller 1011 and a host memory 1012. The host memory 1012 may function as a buffer memory for temporarily storing data to be sent to the storage device 1100 or data sent from the storage device 1100.

The storage device 1100 may include storage mediums for storing data depending on a request from the host 1010. As an example, the storage device 1100 may include at least one of a solid state drive (SSD), an embedded memory, and a detachable external memory. In the case where the storage device 1100 is an SSD, the storage device 1100 may be a device complying with the non-volatile memory express (NVMe) standard. In the case where the storage device 1100 is an embedded memory or an external memory, the storage device 1100 may be a device complying with the universal flash storage (UFS) or embedded multi-media card (eMMC) standard. Each of the host 1010 and the storage device 1100 may generate a packet complying with a standard protocol applied thereto and may transmit the generated packet.

When the nonvolatile memory 1120 of the storage device 1100 includes a flash memory, the flash memory may include a two-dimensional (2D) NAND flash memory array or a three-dimensional (3D) (or vertical) NAND (VNAND) memory array. As another example, the storage device 1100 may be implemented with various kinds of different non-volatile memories. For example, the storage device 1100 may include a magnetic RAM (MRAM), a spin-transfer torque MRAM (STT-MRAM), a conductive bridging RAM (CBRAM), a ferroelectric RAM (FeRAM), a phase change RAM (PRAM), a resistive RAM (RRAM), or at least one of various kinds of different memories.

According to an embodiment, the host controller 1011 and the host memory 1012 may be implemented with separate semiconductor chips. Alternatively, in some embodiments, the host controller 1011 and the host memory 1012 may be implemented in the same semiconductor chip. As an example, the host controller 1011 may be one of a plurality of modules included in an application processor; in this case, the application processor may be implemented with a system on chip (SoC). Also, the host memory 1012 may be an embedded memory included in the application processor or may be a nonvolatile memory or a memory module disposed externally of the application processor.

The host controller 1011 may manage an operation of storing data (e.g., write data) of a buffer area of the host memory 1012 in the nonvolatile memory 1120 or storing data (e.g., read data) of the nonvolatile memory 1120 in the buffer area.

The storage controller 1110 may include a host interface 1111, a memory interface 1112, central processing unit (CPU) 1113. Also, the storage controller 1110 may further include a flash translation layer (FTL) 1114, a journal manager 1115, a buffer memory 1116, an error correction code (ECC) engine 1117, an advanced encryption standard (AES) engine 1118. The storage controller 1110 may further include a working memory (not illustrated) onto which the flash translation layer 1114 is loaded, and data write and read operations of the nonvolatile memory 1120 may be controlled as the CPU 1113 executes the flash translation layer 1114.

The host interface 1111 may exchange packets with the host 1010. The packet that is transmitted from the host 1010 to the host interface 1111 may include a command or data to be written in the nonvolatile memory 1120, and the packet that is transmitted from the host interface 1111 to the host 1010 may include a response to the command or data read from the nonvolatile memory 1120. The memory interface 1112 may provide the nonvolatile memory 1120 with data to be written in the nonvolatile memory 1120, and may receive data read from the nonvolatile memory 1120. The memory interface 1112 may be implemented to comply with a standard such as Toggle or ONFI (Open NAND Flash Interface).

The flash translation layer 1114 may perform various functions (or operations) such as address mapping, wear-leveling, and garbage collection. The address mapping operation refers to an operation of translating a logical address received from the host 1010 into a physical address to be used to actually store data in the nonvolatile memory 1120. Wear-leveling, that is a technology for allowing blocks in the nonvolatile memory 1120 to be used uniformly such that excessive degradation of a specific block is prevented may be implemented, for example, through a firmware technology for balancing erase counts of physical blocks. The garbage collection refers to a technology for securing an available capacity of the nonvolatile memory 1120 through a way to erase an existing block after copying valid data of the existing block to a new block. In an embodiment, the flash translation layer 1114 may be configured to manage and update the metadata MD, which is described with reference to FIGS. 1 to 15.

The journal manager 1115 may manage and store various journal data associated with the update of various metadata that are managed by the storage device 1100. In an embodiment, the journal manager 1115 may be the journal manager described with reference to FIGS. 1 to 15.

The buffer memory 1116 may temporarily store data to be written in the nonvolatile memory 1120 or data read from the nonvolatile memory 1120. The buffer memory 1116 may be a component provided within the storage controller 1110; however, it may be possible to dispose the buffer memory 1116 externally of the storage controller 1110. In an embodiment, the buffer memory 1116 may be a buffer memory configured to store the metadata MD, which is described with reference to FIGS. 1 to 15. Alternatively, the buffer memory 1116 may be the journal memory to store the journal data JNL described with reference to FIGS. 1 to 15.

The ECC engine 1117 may perform an error detection and correction function on data read from the nonvolatile memory 1120. In detail, the ECC engine 1117 may generate parity bits for write data to be written in the nonvolatile memory 1120, and the parity bits thus generated may be stored in the nonvolatile memory 1120 together with the write data. When data is read from the nonvolatile memory 1120, the ECC engine 1117 may correct an error of the read data by using parity bits read from the nonvolatile memory 1120 together with the read data and may output the error-corrected read data.

The AES engine 1118 may perform at least one of an encryption operation and a decryption operation on data input to the storage controller 1110 by using a symmetric-key algorithm.

In an embodiment, the storage controller 1110 may further include a packet manager that generates a packet complying with a protocol of an interface agreed with the host 1010 or parses a variety of information from the packet received from the host 1010.

Figure 17:
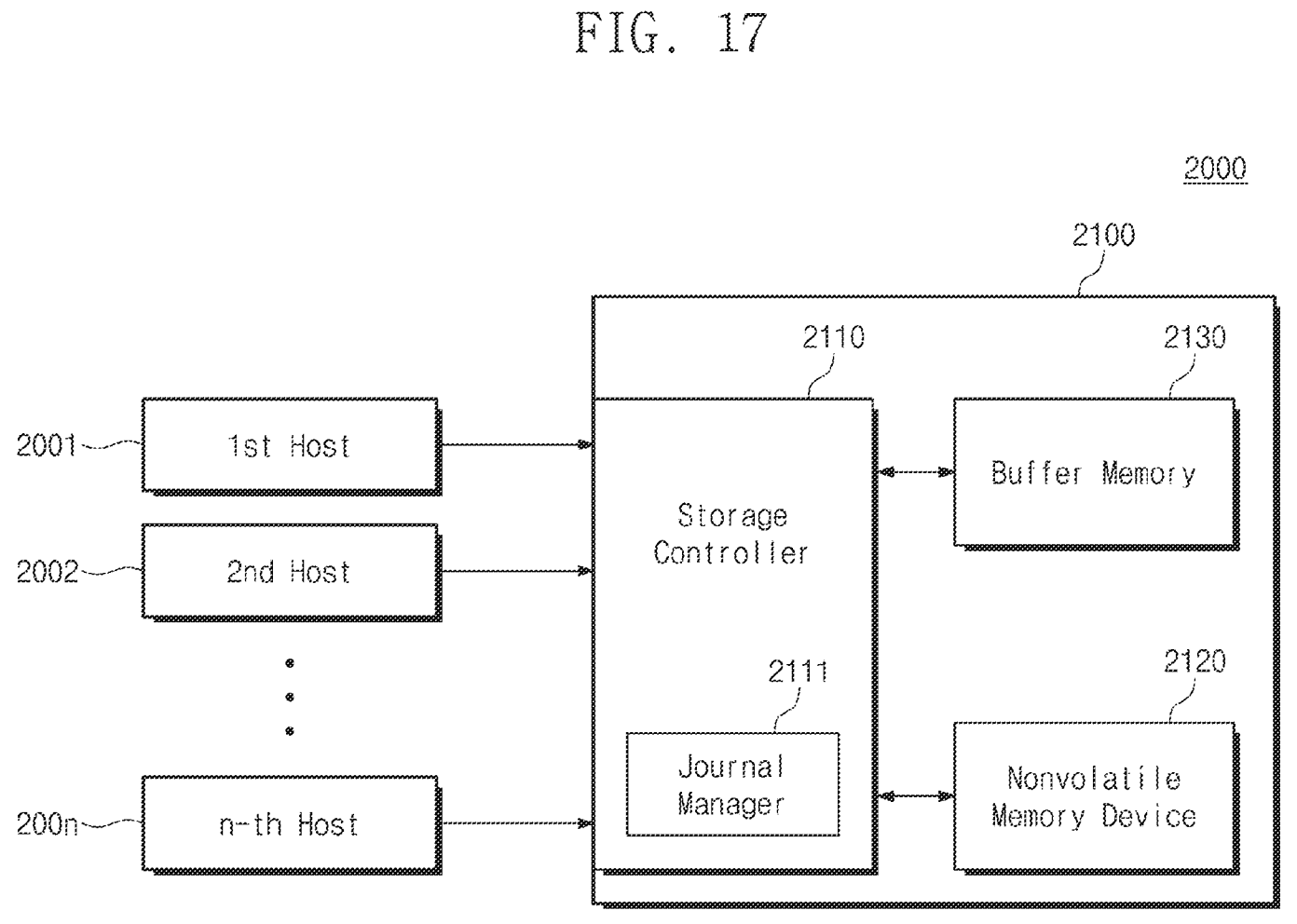

FIG. 17 is a block diagram illustrating a storage system according to an embodiment of the present disclosure. Referring to FIG. 17, a storage system 2000 may include a plurality of hosts 2001 to 200n and a storage device 2100. The plurality of hosts 2001 to 200n may be configured to access the storage device 2100. For example, each of the plurality of hosts 2001 to 200n may store data in the storage device 2100 or may read data stored in the storage device 2100.

The storage device 2100 may include a storage controller 2110, a nonvolatile memory device 2120, and a buffer memory 2130. Overall operations of the storage device 2100, the storage controller 2110, the nonvolatile memory device 2120, and the buffer memory 2130 are similar to those described above, and thus, additional description will be omitted to avoid redundancy.

In an embodiment, the storage controller 2110 may include a journal manager 2111. The journal manager 2111 may generate and manage journal data associated with update information of various metadata that are used in an operation of the storage device 2100.

In an embodiment, according to the method described with reference to FIGS. 1 to 16, the journal manager 2111 may split the journal data JNL into a plurality of groups based on the dependency of the journal data JNL and may replay the journal data JNL in parallel.

In an embodiment, the journal manager 2111 may identify the dependency of the journal data JNL with respect to the plurality of hosts 2001 to 200n. For example, the journal manager 2111 may generate first journal data associated with the update of metadata according to a request or an operation of the first host 2001 and may generate second journal data associated with the update of metadata according to a request or an operation of the second host 2002. The journal manager 2111 may manage the first and second journal data as journal data having no mutual dependency. In the restoration of the metadata, the journal manager 2111 may replay the first and second journal data in parallel. That is, the journal manager 2111 may classify (or identify or determine) the dependency of journal data based on a host corresponding to the journal data.

Figure 18:
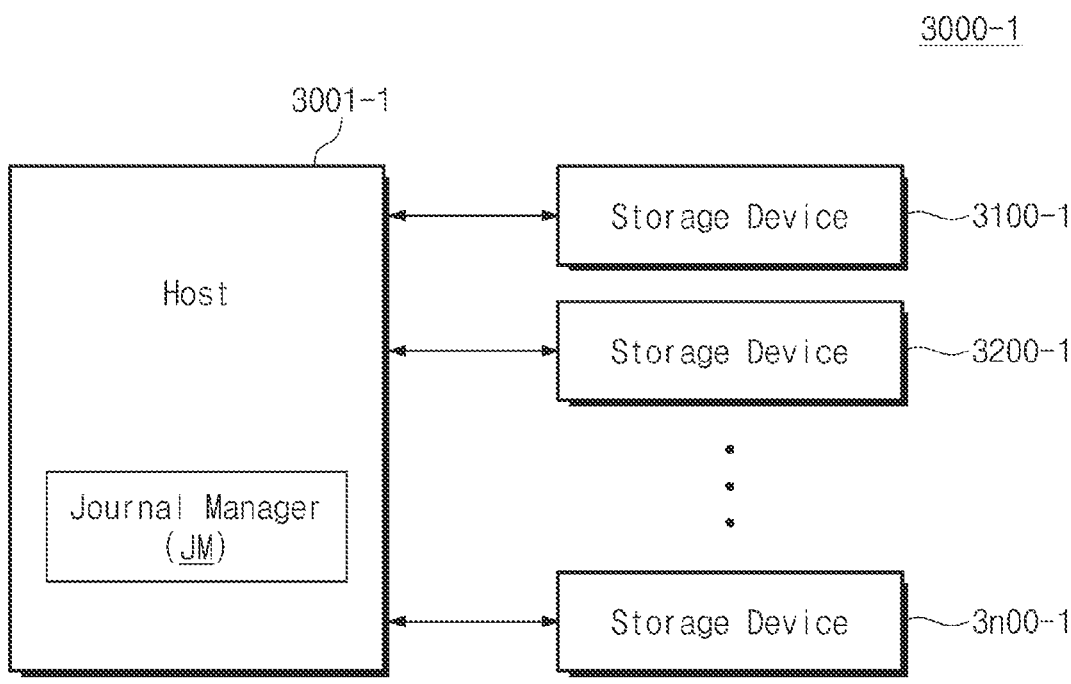
FIG. 18 is a block diagram illustrating a storage system according to an embodiment of the present disclosure.

FIG. 18 is a block diagram illustrating a storage system according to an embodiment of the present disclosure. Referring to FIG. 18, a storage system 3000-1 may include a host 3001-1 and a plurality of storage devices 3100-1 to 3n00-1. The host 3001-1 may be configured to control the plurality of storage devices 3100-1 to 3n00-1.

Each of the plurality of storage devices 3100-1 to 3n00-1 may be configured to manage metadata necessary for an operation thereof; each of the plurality of storage devices 3100-1 to 3n00-1 may manage journal data through a journal manager described with reference to FIGS. 1 to 16.

In an embodiment, the host 3001-1 may include a journal manager JM. The journal manager JM included in the host 3001-1 may be configured to manage journal data associated with the update of metadata that is managed by the host 3001-1. For example, the host 3001-1 may be configured to control or access the plurality of storage devices 3100-1 to 3n00-1 independently of each other. In this case, the host 3001-1 may manage various metadata necessary to access or control the plurality of storage devices 3100-1 to 3n00-1 individually or collectively. In an embodiment, as in the above description, the journal manager JM of the host 3001-1 may replay journal data simultaneously or in parallel based on the dependency of the journal data.

In an embodiment, the dependency of the journal data managed by the host 3001-1 may be determined through various methods as described above. Alternatively, the dependency of the journal data managed by the host 3001-1 may be determined depending on a corresponding storage device. For example, journal data corresponding to the first storage device 3100-1 may be determined by the journal manager JM as having the dependency and thus may be replayed by one replaying unit; journal data corresponding to the second storage device 3200-1 may be determined by the journal manager JM as having the dependency and thus may be replayed by another replaying unit. In this case, the journal data corresponding to the first storage device 3100-1 and the journal data corresponding to the second storage device 3200-1 may be determined as having no mutual dependency, and the journal data may be replayed independently of each other, at the same time, or in parallel.

Figure 19:
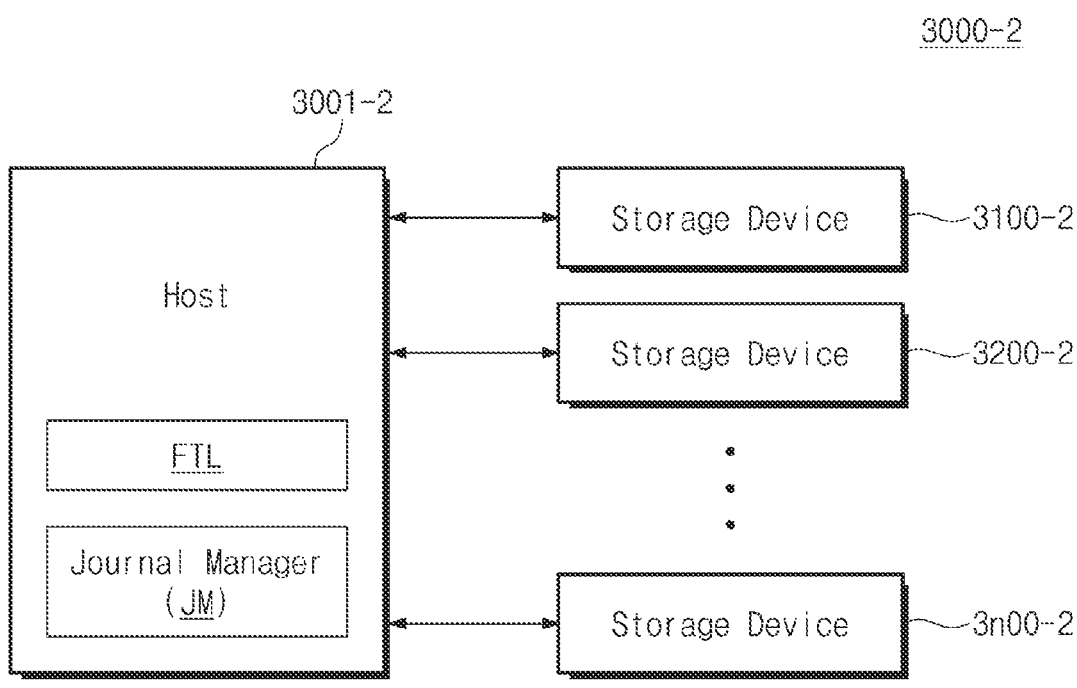
FIG. 19 is a block diagram illustrating a storage system, according to an embodiment of the present disclosure.

FIG. 19 is a block diagram illustrating a storage system according to an embodiment of the present disclosure. Referring to FIG. 19, a storage system 3000-2 may include a host 3001-2 and a plurality of storage devices 3100-2 to 3n00-2. The host 3001-2 may include the journal manager JM. The host 3001-2, the journal manager JM, and the plurality of storage devices 3100-2 to 3n00-2 are similar to those described with reference to FIG. 18, and thus, additional description will be omitted to avoid redundancy.

In an embodiment, the host 3001-2 may further include a flash translation layer FTL. In the embodiments described with reference to FIGS. 1 to 18, the flash translation layer FTL is included in a storage controller of a storage device and performs various maintenance operations on a nonvolatile memory device. In contrast, in the embodiment of FIG. 19, the flash translation layer FTL may be included in the host 3001-2. In this case, the flash translation layer FTL of the host 3001-2 may perform various maintenance operations on each of the plurality of storage devices 3100-2 to 3n00-2 and may manage metadata on each of the plurality of storage devices 3100-2 to 3n00-2. In an embodiment, according to various methods described with reference to FIGS. 1 to 18, the journal manager JM of the host 3001-2 may manage journal data associated with the update of metadata managed by the flash translation layer FTL of the host 3001-2 and may replay the journal data independently, simultaneously, or in parallel based on the dependency of the journal manager.

Figure 20:
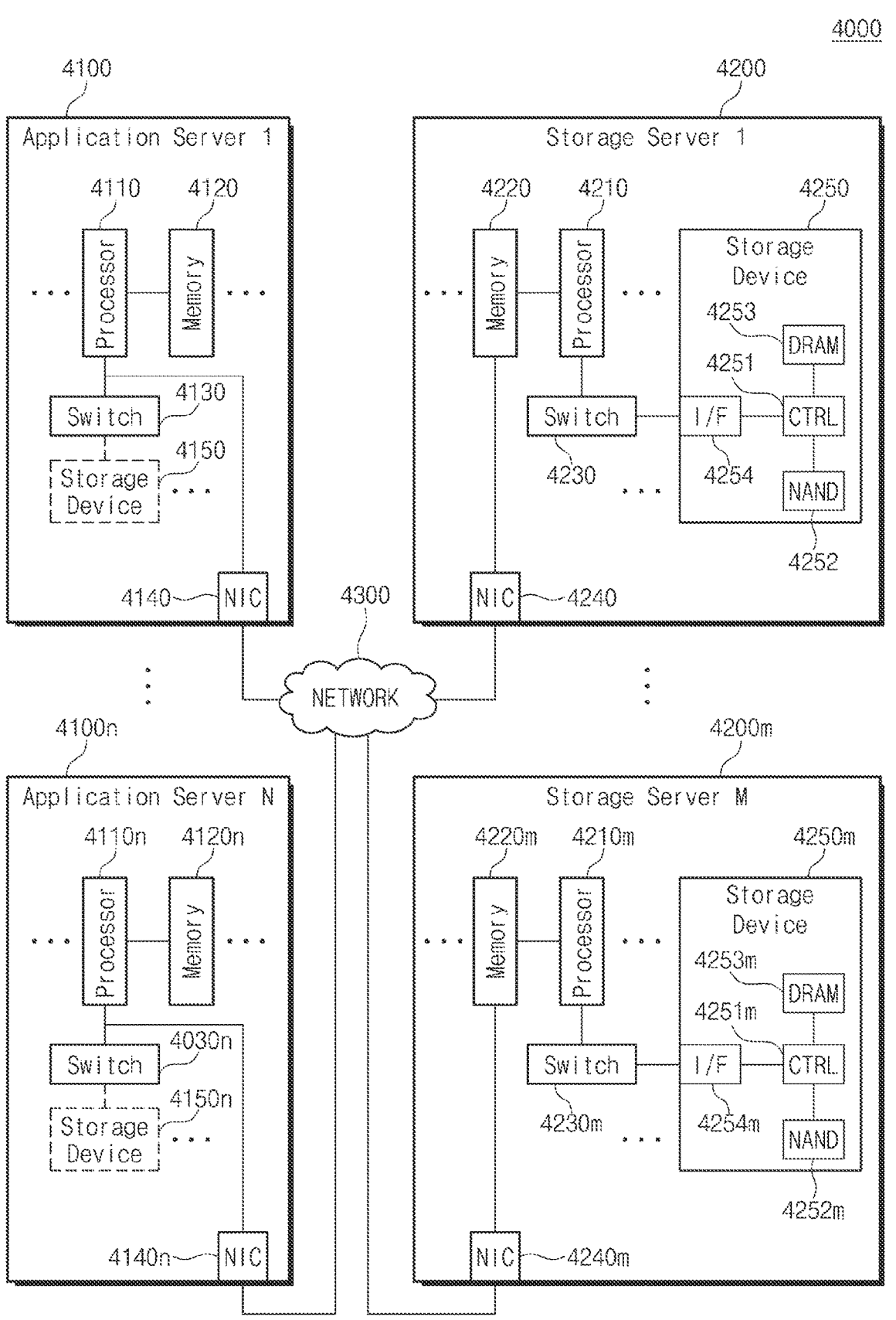
FIG. 20 is a block diagram illustrating a data center to which a storage device according to an embodiment of the present disclosure is applied.

FIG. 20 is a diagram of a data center 4000 to which a memory device is applied, according to an embodiment.

Referring to FIG. 20, the data center 4000 may be a facility that collects various types of partial of data and provides services and may be referred to as a data storage center. The data center 4000 may be a system for operating a search engine and a database, and may be a computing system used by companies, such as banks, or government agencies. The data center 4000 may include application servers 4100 to 4100n and storage servers 4200 to 4200m. The number of application servers 4100 to 4100n and the number of storage servers 4200 to 4200m may be variously selected according to various embodiments. The number of application servers 4100 to 4100n may be different from the number of storage servers 4200 to 4200m.

The application server 4100 or the storage server 4200 may include at least one of processors 4110 and 4210 and memories 4120 and 4220. The storage server 4200 will now be described as an example. The processor 4210 may control all operations of the storage server 4200, access the memory 4220, and execute instructions and/or data loaded in the memory 4220. The memory 4220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the number of processors 4210 and memories 4220 included in the storage server 4200 may be variously selected. In an embodiment, the processor 4210 and the memory 4220 may provide a processor-memory pair. In an embodiment, the number of processors 4210 may be different from the number of memories 4220. The processor 4210 may include a single-core processor or a multi-core processor. The above description of the storage server 4200 may be similarly applied to the application server 4100. In some embodiments, the application server 4100 may not include a storage device 4150. The storage server 4200 may include at least one storage device 4250. The number of storage devices 4250 included in the storage server 4200 may be variously selected according to differing embodiments.

The application servers 4100 to 4100n may communicate with the storage servers 4200 to 4200m through a network 4300. The network 4300 may be implemented by using a fiber channel (FC) or Ethernet. In this case, the FC may be a medium used for relatively high-speed data transmission and use an optical switch with high performance and high availability. The storage servers 4200 to 4200m may be provided as file storages, block storages, or object storages according to the access method of the network 4300.

In an embodiment, the network 4300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 4300 may be a general network, such as a TCP/IP network. For example, the network 4300 may be implemented according to a protocol, such as FC over Ethernet (FCoE), network attached storage (NAS), and NVMe over Fabrics (NVMe-oF).

Hereinafter, the application server 4100 and the storage server 4200 will be described. A description of the application server 4100 may be applied to another application server 4100n, and a description of the storage server 4200 may be applied to another storage server 4200m.

The application server 4100 may store data, which is requested by a user or a client to be stored, in one of the storage servers 4200 to 4200m through the network 4300. Also, the application server 4100 may obtain data, which is requested by the user or the client to be read, from one of the storage servers 4200 to 4200m through the network 4300. For example, the application server 4100 may be implemented as a web server or a database management system (DBMS).

The application server 4100 may access a memory 4120n or a storage device 4150n, which is included in another application server 4100n, through the network 4300. Alternatively, the application server 4100 may access memories 4220 to 4220m or storage devices 4250 to 4250m, which are included in the storage servers 4200 to 4200m, through the network 4300. Thus, the application server 4100 may perform various operations on data stored in application servers 4100 to 4100n and/or the storage servers 4200 to 4200m. For example, the application server 4100 may execute an instruction for moving or copying data between the application servers 4100 to 4100n and/or the storage servers 4200 to 4200m. In this case, the data may be moved from the storage devices 4250 to 4250m of the storage servers 4200 to 4200m to the memories 4120 to 4120n of the application servers 4100 to 4100n directly or through the memories 4220 to 4220m of the storage servers 4200 to 4200m. The data moved through the network 4300 may be data that is encrypted for security or privacy.

The storage server 4200 will now be described as an example. An interface 4254 may provide physical connection between a processor 4210 and a controller 4251 and a physical connection between a network interface card (NIC) 4240 and the controller 4251. For example, the interface

4254 may be implemented using a direct attached storage (DAS) scheme in which the storage device 4250 is directly connected with a dedicated cable. For example, the interface 4254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 4200 may further include a switch 4230 and the NIC(Network InterConnect) 4240. The switch 4230 may selectively connect the processor 4210 to the storage device 4250 or selectively connect the NIC 4240 to the storage device 4250 via the control of the processor 4210.

In an embodiment, the NIC 4240 may include a network interface card and a network adaptor. The NIC 4240 may be connected to the network 4300 by a wired interface, a wireless interface, a Bluetooth interface, or an optical interface. The NIC 4240 may include an internal memory, a digital signal processor (DSP), and a host bus interface and be connected to the processor 4210 and/or the switch 4230 through the host bus interface. The host bus interface may be implemented as one of the above-described examples of the interface 4254. In an embodiment, the NIC 4240 may be integrated with at least one of the processor 4210, the switch 4230, and the storage device 4250.

In the storage servers 4200 to 4200*m* or the application servers 4100 to 4100*n*, a processor may transmit a command to storage devices 4150 to 4150*n* and 4250 to 4250*m* or the memories 4120 to 4120*n* and 4220 to 4220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 4150 to 4150*n* and 4250 to 4250*m* may transmit a control signal and a command/address signal to NAND flash memory devices 4252 to 4252*m* in response to a read command received from the processor. Thus, when data is read from the NAND flash memory devices 4252 to 4252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 4251 may control all operations of the storage device 4250. In an embodiment, the controller 4251 may include SRAM. The controller 4251 may write data to the NAND flash memory device 4252 in response to a write command or read data from the NAND flash memory device 4252 in response to a read command. For example, the write command and/or the read command may be provided from the processor 4210 of the storage server 4200, the processor 4210*m* of another storage server 4200*m*, or the processors 4110 and 4110*n* of the application servers 4100 and 4100*n*. DRAM 4253 may temporarily store (or buffer) data to be written to the NAND flash memory device 4252 or data read from the NAND flash memory device 4252. Also, the DRAM 4253 may store metadata. Here, the metadata may be user data or data generated by the controller 4251 to manage the NAND flash memory device 4252. The storage device 4250 may include a secure element (SE) for security or privacy.

In an embodiment, controllers included in the storage devices 4150 to 4150*n* and 4250 to 4250*m* or CPUs of servers may be configured to manage various metadata. Journal data for guaranteeing the reliability of various metadata may be managed by the controllers included in the storage devices 4150 to 4150*n* and 4250 to 4250*m* or the CPUs of the servers 4100 to 4200*m*. In this case, the controllers included in the storage devices 4150 to 4150*n* and 4250 to 4250*m* or the CPUs of the servers 4100 to 4200*m* may include the journal manager described with reference to FIGS. 1 to 19 or may operate based on the method described with reference to FIGS. 1 to 19.

According to the present disclosure, a storage device may restore metadata by generating journal data associated with the update of the metadata and replaying the journal data. In this case, the storage device may replay the journal data in parallel based on the dependency of the journal data. This may mean that a time taken to restore the metadata is shortened. Accordingly, a storage device with improved performance and improved reliability and an operating method thereof are provided.

While the present disclosure has been described with reference to embodiments thereof, it will be apparent to those of skill in the art that various changes and modifications may be made thereto without departing from the spirit and scope of the present disclosure as set forth in the following appended claims.

What is claimed is:

1. A storage device comprising:
   a nonvolatile memory device; and
   a storage controller configured to control the nonvolatile memory device and to update metadata based on the control for the nonvolatile memory device,
   wherein the storage controller includes:
   a journal data generator configured to generate a plurality of journal data associated with the update of the metadata; and
   a journal data replayer configured to replay the plurality of journal data in parallel to restore the metadata,
   wherein the journal data replayer includes:
   a journal data splitting unit configured to determine a dependency of each of the plurality of journal data based on an opcode field of each of the plurality of journal data, and split the plurality of journal data into a plurality of groups based on the dependency of each of the plurality of journal data, and
   a plurality of replaying units respectively corresponding to the plurality of groups,
   wherein each of the plurality of replaying units is configured to replay journal data included in the corresponding one of the plurality of groups,
   wherein the journal data generator is further configured to set an identifier field of each of the plurality of journal data based on the dependency of each of the plurality of journal data, and
   wherein the identifier field of each of the plurality of journal data includes information indicating a corresponding replaying unit of the plurality of replaying units.

2. The storage device of claim 1, wherein the journal data replayer is configured to replay the plurality of journal data in a second order different from a first order in which the plurality of journal data are generated by the journal data generator.

3. The storage device of claim 1, wherein the plurality of replaying units are configured to replay different journal data at the same time.

4. The storage device of claim 1, wherein the storage controller further includes: a journal memory configured to store the plurality of journal data.

5. The storage device of claim 4, wherein the journal memory is divided into a plurality of journal memory units, and wherein the journal data splitting unit is further configured to store the plurality of journal data split into the plurality of groups in the plurality of journal memory units respectively, based on the plurality of groups.

6. The storage device of claim 5, wherein each of the plurality of replaying units is configured to replay journal data stored in a corresponding one of the plurality of journal memory units.

7. The storage device of claim 1, wherein the journal data splitting unit is configured to split the plurality of journal data into the plurality of groups based on the identifier field of each of the plurality of journal data.

8. The storage device of claim 1, wherein the storage controller further includes a journal memory configured to store the plurality of journal data, wherein the journal memory is divided into a plurality of journal memory units, and wherein the journal data generator is configured to store the plurality of journal data in the plurality of journal memory units respectively based on the dependency of each of the plurality of journal data.

9. The storage device of claim 8, wherein each of the plurality of replaying units is configured to replay journal data stored in a corresponding one of the plurality of journal memory units.

10. The storage device of claim 1, further comprising:

a buffer memory configured to store the metadata.

11. An operating method of a storage device, wherein the storage device includes a nonvolatile memory device and a storage controller configured to control the nonvolatile memory device, and wherein the method comprises:

reading a plurality of journal data from the nonvolatile memory device;

determining dependency of the plurality of journal data based on an opcode field of each of the plurality of journal data;

splitting the plurality of journal data into a plurality of groups based on an identifier field of each of the plurality of journal data; and replaying journal data respectively included in the plurality of groups in parallel to restore metadata, wherein the identifier field of each of the plurality of journal data is set based on a dependency of the plurality of journal data, and wherein the identifier field of each of the plurality of journal data includes information indicating a corresponding one of a plurality of replaying units in the storage controller.

12. The method of claim 11, further comprising:

before reading the plurality of journal data from the nonvolatile memory device, updating the metadata based on an operation of the nonvolatile memory device and generating the plurality of journal data based on the update of the metadata; and when a sudden power-off is sensed, flushing the plurality of journal data to the nonvolatile memory device.

13. The method of claim 11, wherein, when a first address field of first journal data of the plurality of journal data is included in a first address range, the first journal data are classified as a first group of the plurality of groups, and wherein, when the first address field of the first journal data of the plurality of journal data is included in a second address range different from the first address range, the first journal data are classified as a second group of the plurality of groups.

14. The method of claim 13, wherein, when the first journal data are classified as the first group, the first journal data are replayed by a first replaying unit of the plurality of replaying units included in the storage controller, and wherein, when the first journal data are classified as the second group, the first journal data are replayed by a second replaying unit different from the first replaying unit from among the plurality of replaying units.

15. A storage device comprising:

a nonvolatile memory device; and a storage controller configured to control the nonvolatile memory device, wherein the storage controller includes:

a journal data generator configured to generate first to fourth journal data associated with an update of metadata and set an identifier field of each of the first to fourth journal data based on a dependency of the first to fourth journal data, the dependency of the first to fourth journal data being determined based on an opcode field of each of the first to fourth journal data;

a first replaying unit; and a second replaying unit, wherein, when the metadata are lost, the first and second replaying units are configured to replay the first to fourth journal data to restore the metadata, wherein the first replaying unit is configured to replay the first and second journal data, and, while the first replaying unit replays the first and second journal data, the second replaying unit is configured to replay the third and fourth journal data, wherein the journal data generator is further configured to set the identifier fields of the first and second journal data as information indicating the first replaying unit and the identifier fields of the third and fourth journal data as information indicating the second replaying unit, and wherein an opcode of each of the first and second journal data is independent from an opcode of each of the third and fourth journal data.

16. The storage device of claim 15, further comprising:

a buffer memory configured to store the metadata.

17. The storage device of claim 16, wherein the first and second journal data are associated with an update of data included in a first address range of the buffer memory among the metadata, and wherein the third and fourth journal data are associated with an update of data included in a second address range different from the first address range of the buffer memory among the metadata.

* * * * *